United States Patent [19]
Hughes

[11] Patent Number: 5,809,143
[45] Date of Patent: Sep. 15, 1998

[54] SECURE KEYBOARD

[76] Inventor: Thomas S. Hughes, 31310 Eagle Haven Cir., Ste. 100, Rancho Palos Verdes, Calif. 90274

[21] Appl. No.: 896,316
[22] Filed: Jun. 28, 1997

Related U.S. Application Data

[63] Continuation-in-part of Ser. No. 571,016, Dec. 12, 1995, abandoned.

[51] Int. Cl.$^6$ ...................................................... H04K 1/00
[52] U.S. Cl. ............................................... 380/24; 380/52
[58] Field of Search .................................. 380/23, 24, 25, 380/52

[56] References Cited

U.S. PATENT DOCUMENTS

| | | | |
|---|---|---|---|
| 4,924,514 | 5/1990 | Matyas et al. | 380/24 |
| 4,984,270 | 1/1991 | LaBounty | 380/24 |
| 5,163,097 | 11/1992 | Pegg | 380/24 |
| 5,239,583 | 8/1993 | Parrillo | 380/24 |
| 5,256,863 | 10/1993 | Ferguson et al. | 380/24 |
| 5,267,314 | 11/1993 | Stambler | 380/24 |
| 5,267,315 | 11/1993 | Narita et al. | 380/24 |
| 5,317,636 | 5/1994 | Vizcaino | 380/24 |
| 5,367,572 | 11/1994 | Weiss | 380/24 |
| 5,461,217 | 10/1995 | Claus | 380/24 |
| 5,493,613 | 2/1996 | Denno et al. | 380/24 |
| 5,517,569 | 5/1996 | Clark | 380/24 |
| 5,524,072 | 6/1996 | Labaton et al. | 380/24 |
| 5,524,073 | 6/1996 | Stambler | 380/24 |

Primary Examiner—David C. Cain
Attorney, Agent, or Firm—Lee W. Tower

[57] ABSTRACT

Apparatus and methods are provided for transacting secure purchase and bill payment transactions. A method for transacting a secure purchase via an internet using a system including a computer, a first communication device coupled to the computer and to the internet, and a secure keyboard, the secure keyboard including a controller, an interface between the controller and the computer, a removable media interface, an alphanumeric keypad, an encryption device, and a second communication device coupled to a secure host, includes the steps of browsing the internet via the first communication device, retrieving item data for a purchase from the internet via the first communication device, accessing information from removable media using the removable media interface, the information including a user identifier and an issuer identifier, entering a personal identifier number (PIN) on the alphanumeric keypad, encrypting the PIN using the encryption device, sending to the secure host via the second communication device, the information, the item data, and the encrypted PIN, the secure host blocking the information and the PIN from the internet, the secure host requesting authorization from a bank system for making the purchase using the information and PIN, proceeding with the purchase if the secure host receives from the bank system a bank authorization for the purchase, otherwise canceling the purchase, the secure host sending purchase transaction data to the secure keyboard via the second communication device, and the secure keyboard printing a purchase transaction receipt.

21 Claims, 27 Drawing Sheets

CONTENT STORED ON CREDIT CARD

CREDIT ISSUER NO.
CREDIT CARD NO.
NAME OF PERSON
EXPIRATION DATE

CONTENT STORED ON DEBIT CARD

BANK IDENTIFICATION NO.
PERSONAL ACCOUNT NO.
NAME OF PERSON
EXPIRATION DATE

CONTENT STORED ON SMART CARD

ISSUER NO.
SMART CARD NO.
NAME OF PERSON
EXPIRATION DATE
BALANCE

PURCHASE PAYMENT RECEIPT

USER NAME:
   TERMINAL NO.:
   DATE:

AMOUNT CHARGED/DEBITED:
   ACCOUNT NO.
   TRANSACTION TYPE: CREDIT/DEBIT/SMART CARD
   NEW BALANCE (IF DEBIT/SMART CARD):

RECIPIENT/MERCHANT NAME:
   RECIPIENT/MERCHANT NO.:
   TRACE NO.:

ITEM NO.:
   SHIPPING DATE:

TRANSACTION REFERENCE NO.:
   SEQUENCE NO.:

BILL PAYMENT RECEIPT

USER NAME:
   TERMINAL NO.:
   DATE:

AMOUNT CHARGED/DEBITED:
   ACCOUNT NO.
   TRANSACTION TYPE: CREDIT/DEBIT/SMART CARD
   NEW BALANCE (IF DEBIT/SMART CARD):

RECIPIENT/MERCHANT NAME:
   RECIPIENT/MERCHANT NO.:
   TRACE NO.:

TRANSACTION REFERENCE NO.:
   SEQUENCE NO.:

SMART CARD BALANCE TRANSACTION RECEIPT

USER NAME:
    TERMINAL NO.:
    DATE:

AMOUNT CREDITED/(DEBITED):
    ACCOUNT NO.
    TRANSACTION TYPE: SMART CARD
    NEW SMART CARD BALANCE:

TRANSACTION REFERENCE NO.:
    SEQUENCE NO.:

SECURE KEYBOARD

CROSS REFERENCE TO RELATED APPLICATION

This is a continuation-in-part of application Ser. No. 08/571,016 filed on Dec. 12, 1995 now abandoned.

FIELD OF THE INVENTION:

This invention relates to the field of secure communications, and in particular secure transactions using the internet.

BACKGROUND

There is much concern about the security of financial transactions using the internet. While the internet is very useful for browsing for information, many are quite hesitant to send their credit card and personal identification number (PIN) via the internet, because there is a significant risk that the information can be intercepted on the internet and stolen. One way to avoid the problems of the internet is not to use it at all; however, this means that the benefits of the internet cannot be realized.

Thus, it would be desirable to have a system that allows the information browsing features of the internet to be used while avoiding the security risks.

SUMMARY OF THE INVENTION:

According to the invention, apparatus and methods are provided for secure purchase and bill payment transactions. A method for transacting a secure purchase via an internet using a system including a computer, a first communication device coupled to the computer and to the internet, and a secure keyboard, the secure keyboard including a controller, an interface between the controller and the computer, a removable media interface, an alphanumeric keypad, an encryption device, and a second communication device coupled to a secure host, includes the steps of browsing the internet via the first communication device, retrieving item data for a purchase from the internet via the first communication device, accessing information from removable media using the removable media interface, the information including a user identifier and an issuer identifier, entering a personal identifier number (PIN) on the alphanumeric keypad, encrypting the PIN using the encryption device, sending to the secure host via the second communication device, the information, the item data, and the encrypted PIN, the secure host blocking the information and the PIN from the internet, the secure host requesting authorization from a bank system for making the purchase using the information and PIN, proceeding with the purchase if the secure host receives from the bank system a bank authorization for the purchase, otherwise canceling the purchase, the secure host sending purchase transaction data to the secure keyboard via the second communication device, and the secure keyboard printing a purchase transaction receipt.

BRIEF DESCRIPTION OF THE DRAWINGS:

FIGS. 4A, 4B, and 4C illustrate the information content stored on a credit card, debit card and smart card.

FIG. 6 is an illustration of a purchase payment receipt in accordance with the present invention.

FIG. 8 is an illustration of a bill payment receipt in accordance with the present invention.

FIG. 10 is an illustration of a smart card balance transaction receipt in accordance with the present invention.

DETAILED DESCRIPTION

Figure 1:
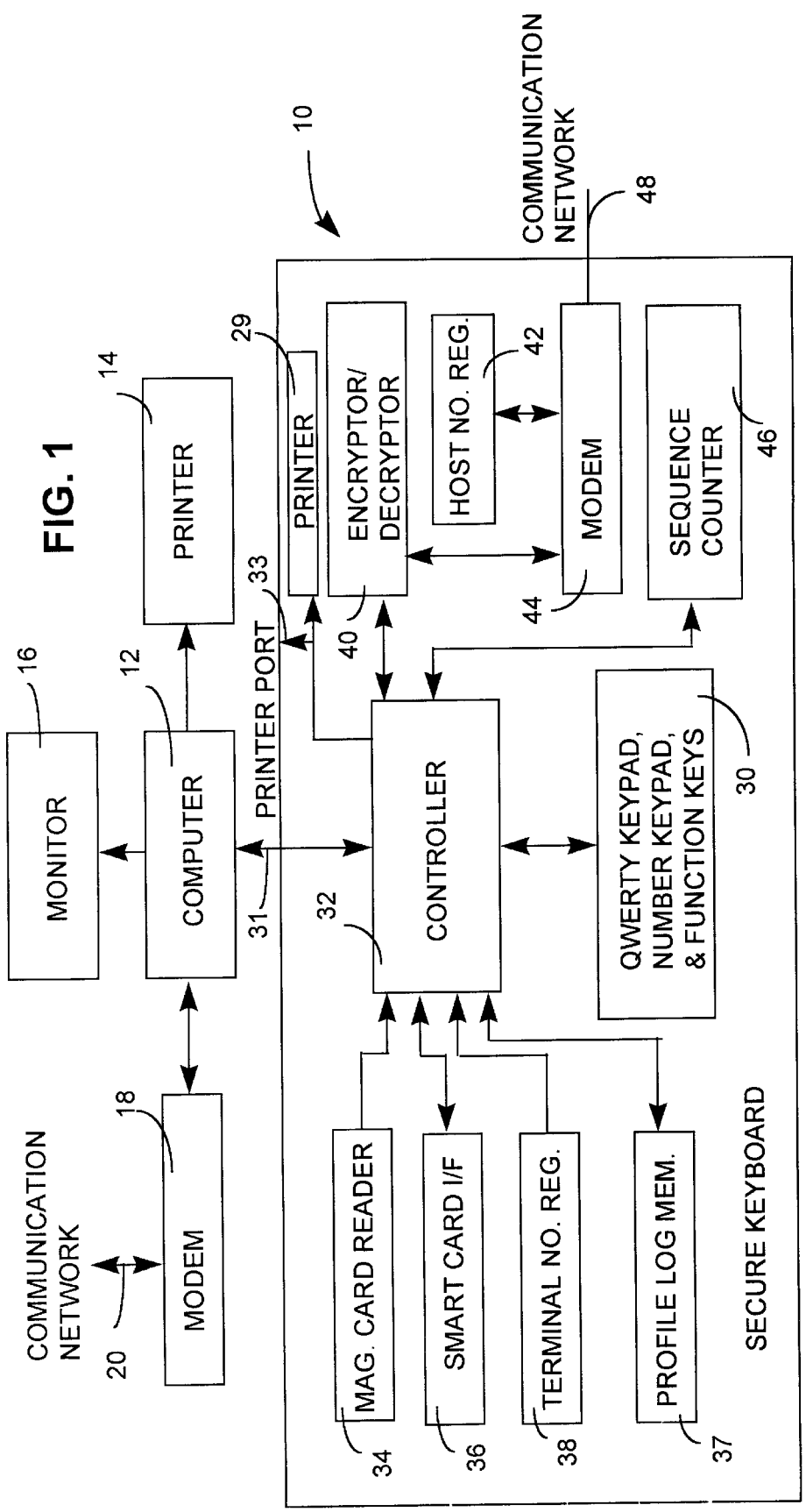
FIG. 1 is a schematic of a secure keyboard in accordance with the present invention.

Referring now to the drawing, and more particularly to FIG. 1, a secure keyboard 10 is shown, which includes a computer interface 31 coupled to computer 12. The computer 12 is coupled to a printer 14 and a monitor 16 and has access to a communication network 20 via modem 18. The secure keyboard has a controller 32, which is coupled to magnetic card reader 34, smart card interface 36, terminal number register 38, a QWERTY keypad 30, number pad and function keys 30, an encrypter and decrypter 40, and sequence counter 46. As shown, the encrypter/decrypter 40 is coupled to a modem 44 which is attached to a communication network 48. The host number register 42 is coupled to modem 44. The communication network 48 can be a telephone line or other communication network such as a cable, or a satellite communication network. In the case of a phone line the communication network 48 can be the same line as communication network 20, which can be a phone line. The secure keyboard 10 is designed to communicate to a particular host via a host number, which is stored in host number register 42. When modem 44 is used, the host register 42 is read by modem 44 in order to dial the host. In general, the modem 44 is not used to connect to any destination via communication network 48.

Figure 2:
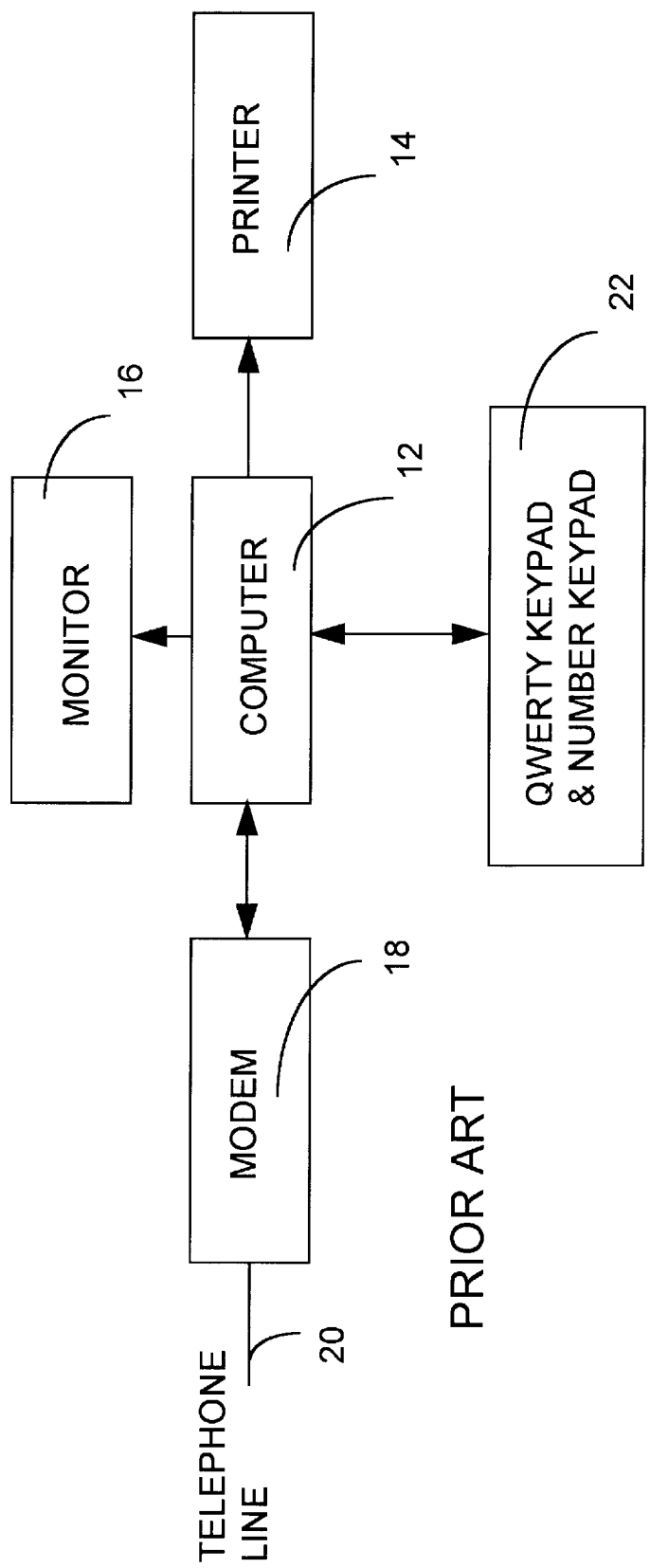
FIG. 2 is a schematic of a prior art computer system.

The secure keyboard 10 also has a printer port 33, which can be used to interface to a printer. The QWERTY keypad 30, number keypad, and function keys 30 can be used in general to input data to computer 12 in the same fashion as with a prior art keyboard, which is shown in FIG. 2. FIG. 2 illustrates a QWERTY keypad and number keypad which can also include function keys 22 that communicate to computer 12, which has a printer 14, a monitor 16, and a modem 18 attached. In the prior art represented by FIG. 2, the QWERTY keypad and number keypad 22 is a entry device which is used to enter data or commands into computer 12. The QWERTY keypad and number keypad 30 of FIG. 1 can be used in a same way.

However, there are certain entries that can be made on QWERTY keypad and number keypad 30 that are blocked by controller 32 from the interface 31 between the controller 32 and the computer 12. This is the feature that provides security for secure keyboard 10. The problem of data security is especially important for financial transactions. Security in secure keyboard 10 is particularly important if data must be encrypted before being sent via the communication network. The secure keyboard 10 operates so that data that needs to be encrypted is blocked by controller 32 from the interface 31 to the computer 12. The data to be encrypted is sent to the encrypter 40 and encrypted and sent via modem 44 to the communication network 48. The blocking of the data to be encrypted from interface 31 ensures that the data to be encrypted is not sent by computer 12 in unencrypted form to communication network 20 via the modem 18. Thus, the data to be encrypted is ensured of being encrypted before being sent, and is sent directly to the host, rather than via a nonsecure computer network, such as the Internet.

The secure keyboard 10 is designed to conduct secure financial transaction for credit cards, debit cards, and smart cards. In a typical financial transaction, information is read from a credit, debit or smart card and then the user enters certain information via QWERTY keypad and number keypad 30. An important data entered by the user enter is the user's personal identification number (PIN). The PIN is assigned to the user by a financial institution and needs to be kept secure. Today, PINs are in common use with automatic teller machine (ATM) debit cards. Even though a user may be able to select his/her own PIN, the PIN should be known only to the user and the financial institution. The PIN is blocked by controller 32 from interface 31 into computer 12 and is encrypted by encrypter 40 and then sent via modem 44 to the host which has been dialed using the host number in host number register 42. Thus, when the PIN is on the communication network 48, the PIN is in an encrypted form. The PIN has been prevented from entering computer 12 and is thereby prevented from possibly being broadcast on communication network 20 via modem 18.

The magnetic card reader 34 is designed to read information from credit and debit cards that have a magnetic strip on the back of them. Credit and debit cards with magnetic strips are quite common today. The smart card interface 36 is designed to read information from a smart card and to write information back to the smart card. A smart card can store information on the card and the information can be read from the card and new information stored back onto the smart card. The information is stored in a memory chip on the smart card.

In order to identify the secure keyboard to the host a terminal number register 38 maintains the terminal number for the secure keyboard 10. A sequence counter 46 may be provided in the secure keyboard. The purpose of the sequence counter is merely to count each transaction via the communication network 48, so that each transaction can be given a unique number.

The encrypter 40 can be implemented to encrypt the PIN and other data via using the data encryption standard DES/DUKPT. The encrypter 40 can also include a decrypter 40. The purpose of the decrypter is to decrypt any encrypted data sent to the secure keyboard from the host via communication network 48. The modem 44 can be a standard modem.

Figure 3A:
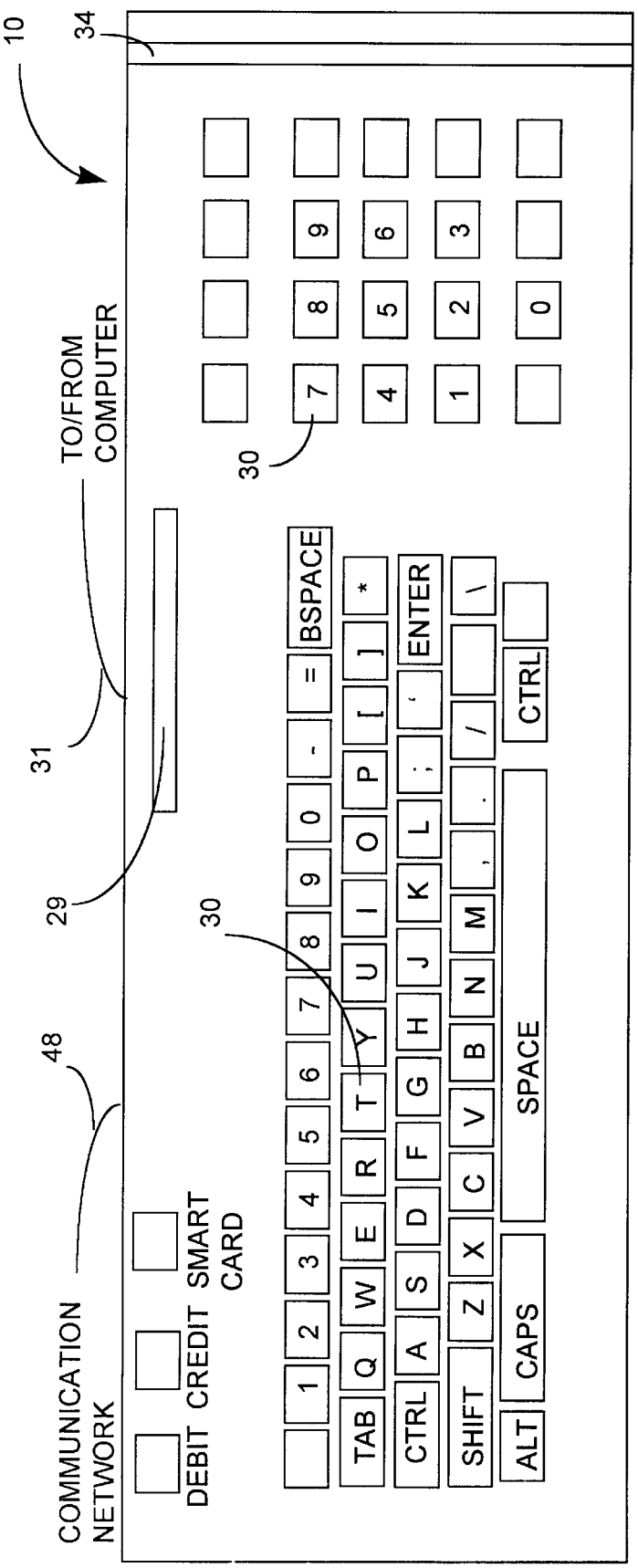
FIG. 3A and FIG. 3B are illustrations of the top and front elevation views, respectively, of a secure keyboard in accordance with the present invention.
Figure 3B:
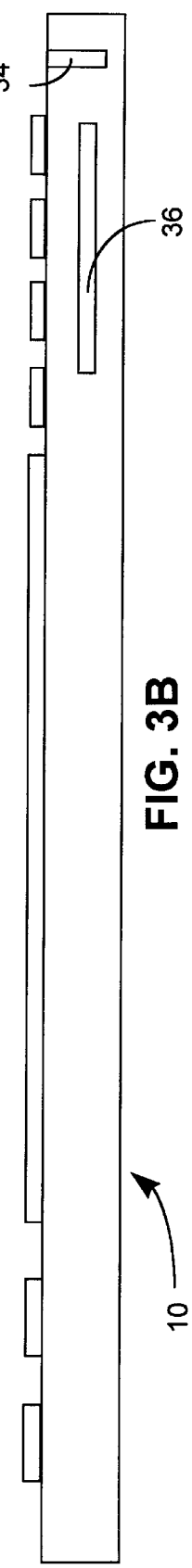

FIGS. 3A and 3B are diagrams illustrating the top and front elevation views, respectively, of secure keyboard 10. As shown, the keyboard 10 has a magnetic card reader slot 34 and a smart card interface 36. The magnetic card reader 34 operates by swiping a credit or debit card through the slot 34. Other magnetic card readers can also be used, such as a card reader that operates by the user inserting the card and then quickly withdrawing the card. The smart cart interface is operated by inserting a smart card into slot 36. Also shown in FIG. 3A is the connection 48 to the communication network and the interface 31 to and from computer 12. As shown, the secure keyboard has a standard QWERTY keyboard and a number keypad, as well as function keys. Special function keys can be included on the secure keyboard such as function keys for selecting a debit, credit or smart card transaction.

FIG. 4A illustrates the data that is stored on a typical credit card and on a magnetic strip. Typical information includes a credit issuer number, a credit card number, the name of the person, and the expiration date. The credit issuer number can be a bank for example. Note that the PIN is not stored on the cards. This prevents a theft from obtaining the PIN number if the card is stolen. The credit card number is the typical credit card number that is embossed on the front of the credit card. FIG. 4B shows the contents typically on a debit card such as an ATM card. This information is also stored on a magnetic strip on the back of the card. Typical information includes a bank identification number, a personal account number, the name of the person, and an expiration date. This bank identification number is analogous to a credit issuer number for a credit card and identifies the bank that issued the debit card. The personal account number is the same as the account number embossed on the front of the debit card and is not to be confused with the PIN. FIG. 4C shows the contents stored on a smart card. The contents are stored on a memory chip that is within the smart card. The memory chip can be read and written by interface electronics in the smart card interface 36. The information stored on a smart card typically includes the issuer number, the smart card number, the name of the person, the expiration date, and the balance available on the smart card. Since a smart card is designed to be read as well as written, the balance can change as transactions are conducted using the smart card. For example, the balance is increased when funds are transferred from a bank account to the smart card.

Figure 5A:
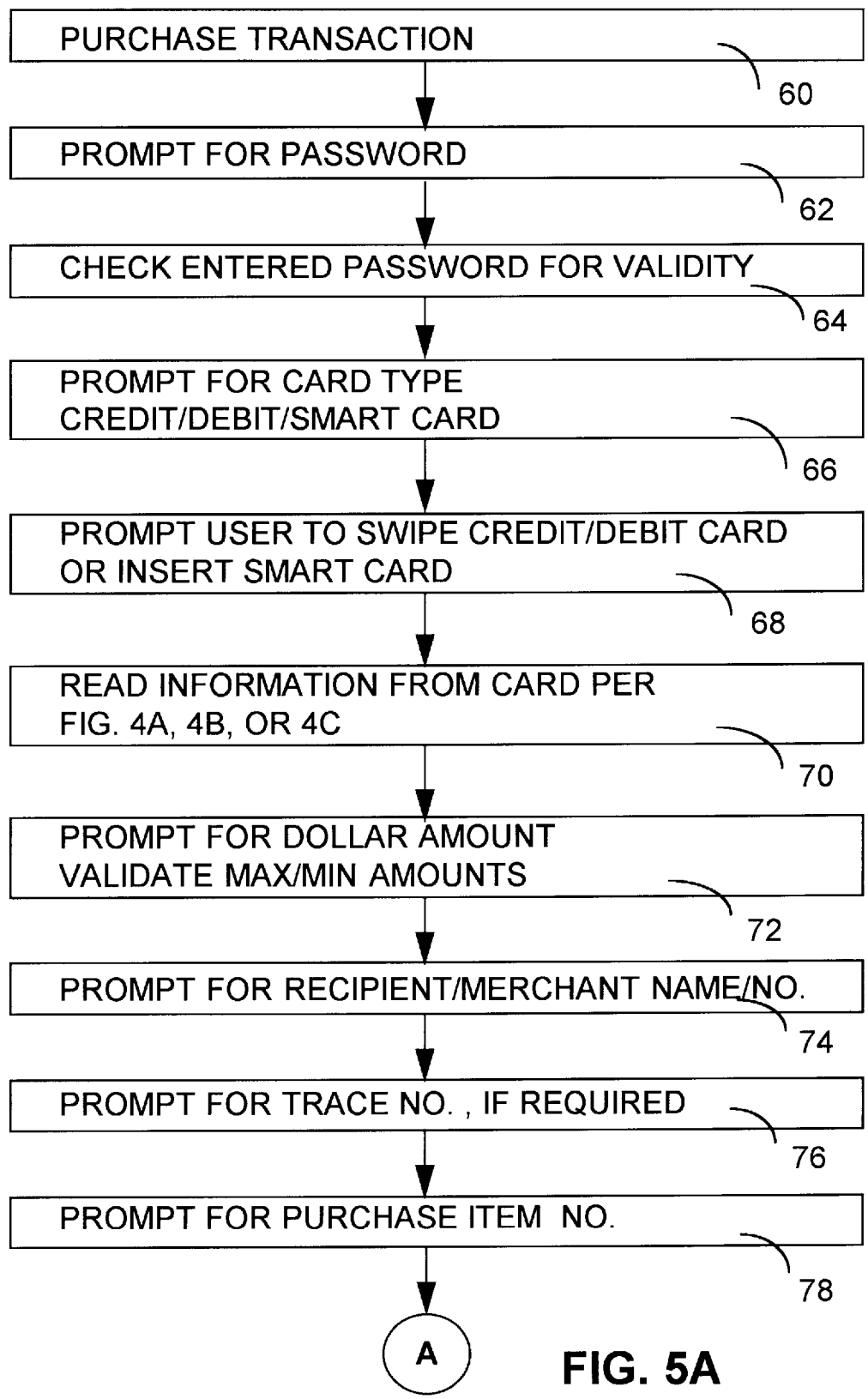
FIGS. 5A and 5B are flow diagrams of a method for a purchase transaction using a secure keyboard in accordance with the present invention.
Figure 5B:
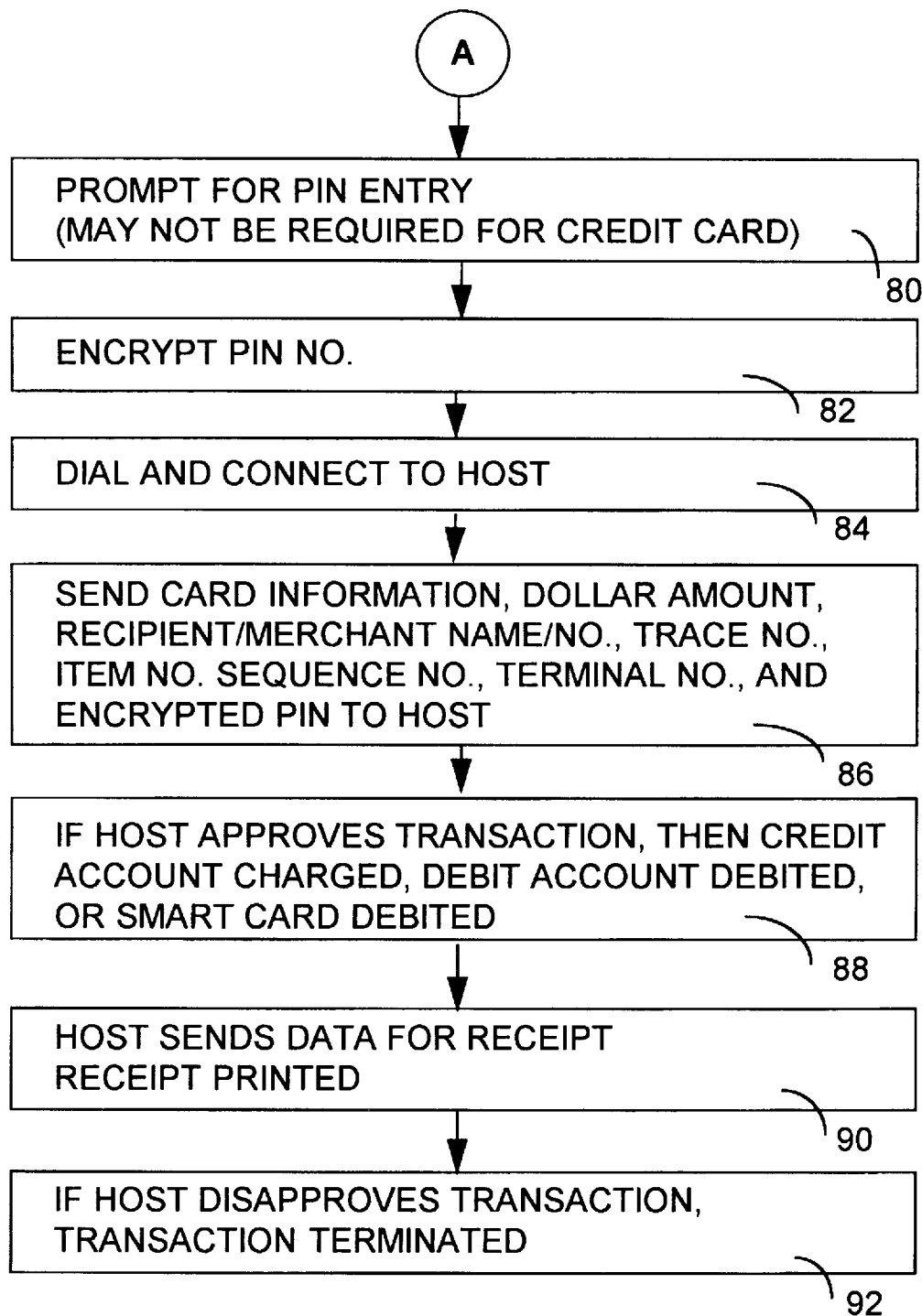

FIG. 5 illustrates a method for conducting a purchase transaction using the secure keyboard 10. In step 60 a purchase transaction is selected. The user is then prompted via the monitor 16 to enter a password with is checked in step 64 for validity. Then the user is prompted via the monitor 16 to enter a card type, such as credit card, debit card or smart card. Then in the step 68 the user is prompted to swipe the credit or debit card via the magnetic card reader 34 or to insert the smart card into smart card interface 36. Then in step 70, the information as illustrated in FIG. 4A, 4B, or 4C is read from the card. Then in step 72, the user is prompted via monitor 16 to enter a dollar amount for the transaction. Also in step 72 the dollar amount that has been entered can be checked to determine whether the dollar amount is between certain maximum or minimum amounts that have been specified. Then in step 74, the user is prompted to enter a recipient name or number for the transactions. The recipient can be a merchant. Then in step 76, the user is prompted to enter a trade number, which provides further identification of the recipient/merchant, if that is required. Then in step 78, the user is prompted to enter a purchase item number. For example, a purchase item number might be a catalog number and item number for an item in the catalog. In FIG. 5B, in step 80 the user is prompted to enter his or her personal identification number (PIN). It is common now to enter personal identification numbers when transacting debit card or ATM card transactions. This is not a common thing when transacting a credit card transaction. However, in the future a PIN entry might be required for all financial transactions since use of a PIN ensures that the transaction is more secure. For a smart card transaction a PIN is required.

Then in step 82 the PIN is encrypted. The host is then dialed in step 84 using the host number read from host number register 42. Then in step 86, the card information, the dollar amount, the recipient/merchant name and number, the trace number, the item number, the sequence number, the terminal number, and encrypted PIN are send to the host. It is possible that some data items may not be sent and/or that additional data items may be sent. As discussed before the sequence number is a number that increments each time a transaction is conducted in order to identify the transaction number on a receipt which can be printed later. The terminal number is another way to identify the source of the transaction to the host. In step 88 if the host approves the transaction, then a credit card account is charged, a debit account is debited, or a smart card balance is debited. Note that when the smart card is debited then the host changes the smart card balance stored on the smart card, as shown on FIG. 4C. In step 90 the host sends data for a receipt and the receipt is printed using printer 14. Alternately, the receipt can be sent to a printer via printer port 33 on secure keyboard 10. In step 92, if the host disapproves the transaction, then the transaction is terminated.

For a purchase transaction the host will then forward the information to the recipient. For example if the recipient is a merchant, then the merchant will ship the item to the purchaser. A purchase transaction can also be used to purchase a service. In case of a service, when the recipient is paid, the recipient provides the service to the purchaser. For example, the recipient can be a cleaning service.

FIG. 6 shows a purchase receipt that is printed when the transaction in completed. As shown, the transaction on the receipt includes the user name, the terminal number, the date, the amount charged or debited, the account number, the transaction type (credit, debit, or smart card), the new balance for a smart card or debit card transaction, the recipient/merchant name, the recipient/merchant number, the trace number, the item number, the shipping date for goods to be shipped, a transaction reference number, and the sequence number. Note that the sequence number was originally sent from the secure keyboard to the host. The transaction reference number is used by the host as another way to track the transaction.

Figure 7A:
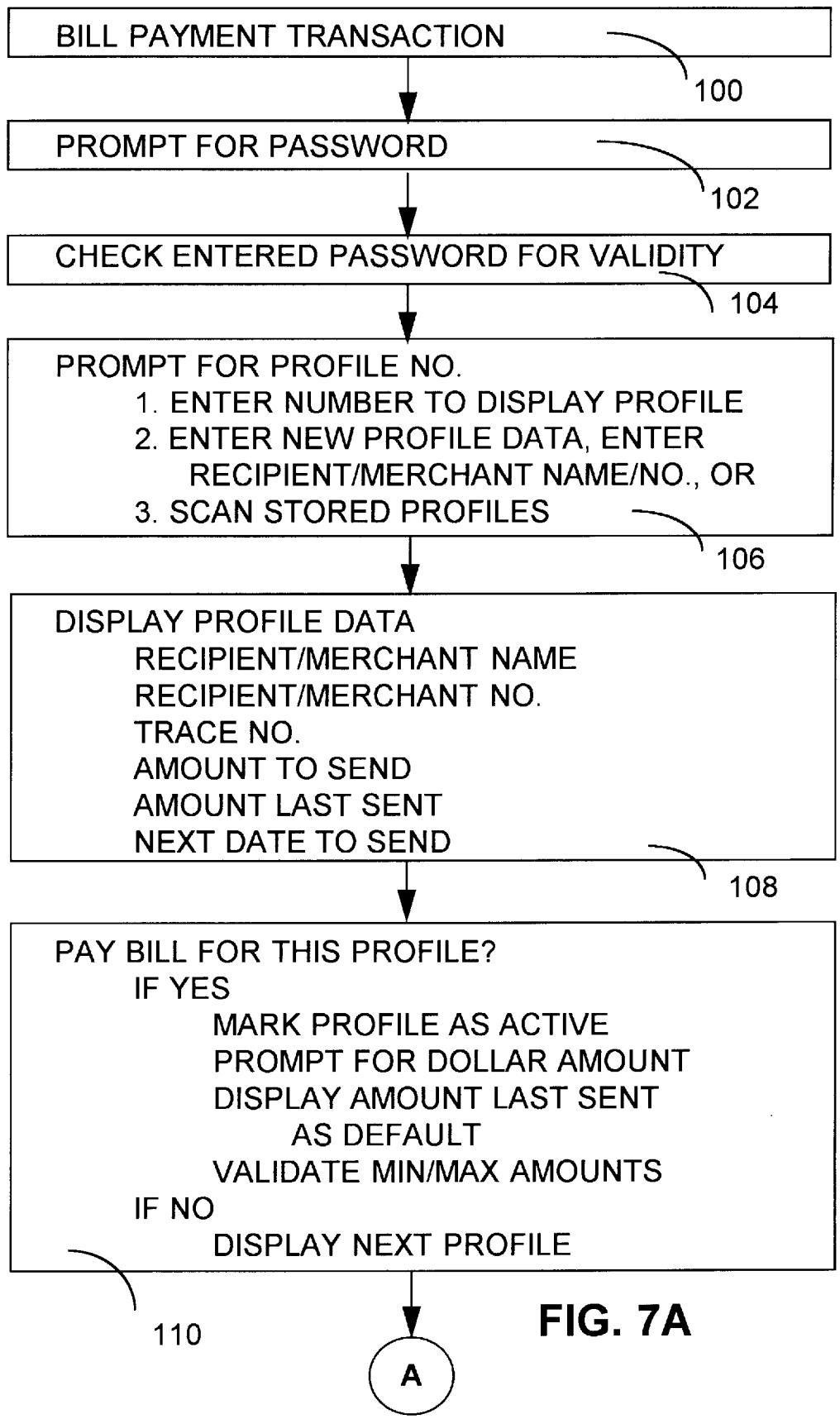
FIGS. 7A, 7B and 7C are flow diagrams of a method for a bill payment using a secure keyboard in accordance with the present invention.
Figure 7B:
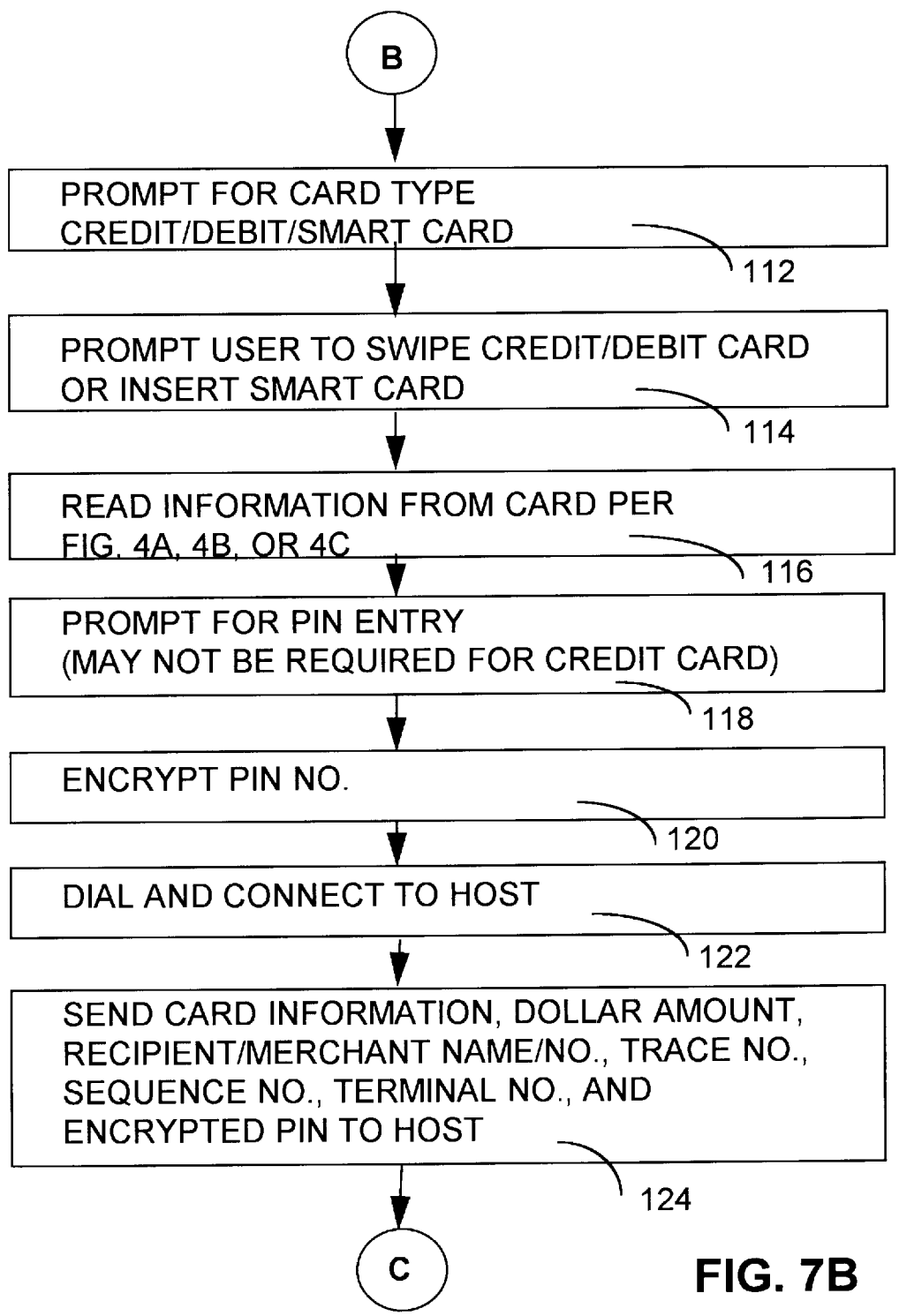
Figure 7C:
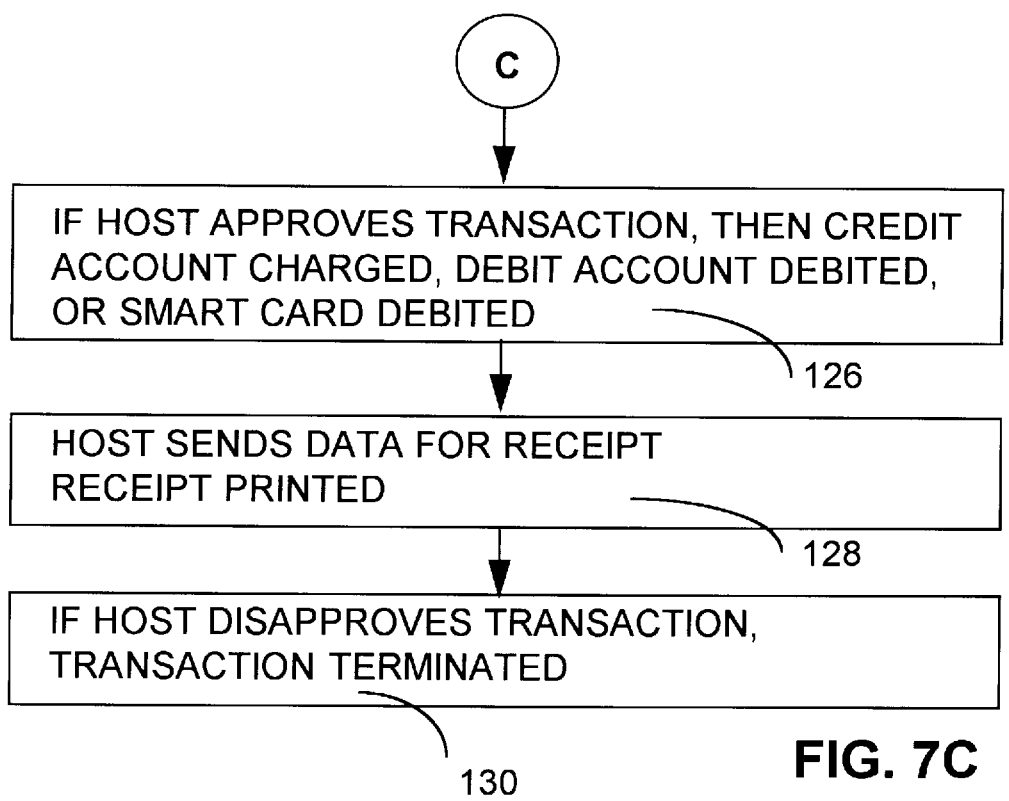

FIG. 7A is a method for transacting bill payment transactions using secure keyboard 10. In step 100 a bill payment transaction is selected and in step 102 the user is prompted to enter a password, which in step 104 is checked for validity. Then in step 106, the user is prompted to enter a profile number. If a profile number is entered, then the profile is displayed to the user on monitor 16. Alternatively the user can enter data for a new profile. The new profile data includes the recipient/merchant name and number, etc. Or the user can scan stored profiles to select a profile. When a profile is displayed, the monitor 16 shows the profile data, which includes: the recipient/merchant name, the recipient/merchant number, the trace number, the amount to send, the amount last sent, and the next date to send, as shown in step 108.

The profile for a bill payment transaction can be stored in a profile log memory 37 on the secure keyboard 10. The profile log memory is coupled to the controller 32.

Profiles are particularly useful when a particular bill is paid on a regular basis to a particular merchant or to a recipient, which is a provider of services, such as the telephone company. By selecting a stored profile, the user is relieved of the task of reentering the data for the recipient/merchant each time the bill is paid. When a profile is displayed the user is prompted to enter yes or no for payment of the bill. If the user selects yes, then the profile is marked as active, and the user is prompted for a dollar amount which can be the amount last sent as a default. The entered dollar amount can be validated against specified minimum and maximum amounts. If user selects not to pay that profile then the next profile can be displayed.

In step 112 the user is prompted for a card type such as credit, debit, or smart card. Then in step 114 the user is prompted to swipe the credit or debit card or to insert the smart card into smart card interface 36. Then in step 116 the information on the card per FIG. 4A, 4B, or 4C is read from the card. Then in step 118 the user is prompted to enter his or her personal identification number (PIN). In step 120 the PIN is encrypted and step 122 the host is dialed using the host number stored in host number register 42 and the secure keyboard is connected via the communication network 48 to the host. Then in step 124, the card information, the dollar amount, the recipient/merchant name, the recipient/merchant number, the trace number, the sequence number, the terminal number, and encrypted PIN are sent to the host. In step 126 if the host approves the transaction, then the credit account is charged, the debit account is debited, or the smart card is debited by the amount of the transaction. Then in step 128 the host sends data for a receipt and the receipt can be printed using printer 14. Alternately, the receipt can be sent to a printer via printer port 33 on secure keyboard 10. In step 130, if the host disapproves the transaction, then the transaction is terminated and the bill is not paid.

FIG. 8 shows a form of a bill payment receipt. The bill payment receipt includes the user name, the terminal number, the date, the amount charged or debited, the account number, the transaction type such as credit, debit, or smart card, a new balance if the transaction is a smart card or a debit card transaction, the recipient/merchant name, the recipient/merchant number, the trace number, the transaction reference number, and finally the sequence number.

Figure 9A:
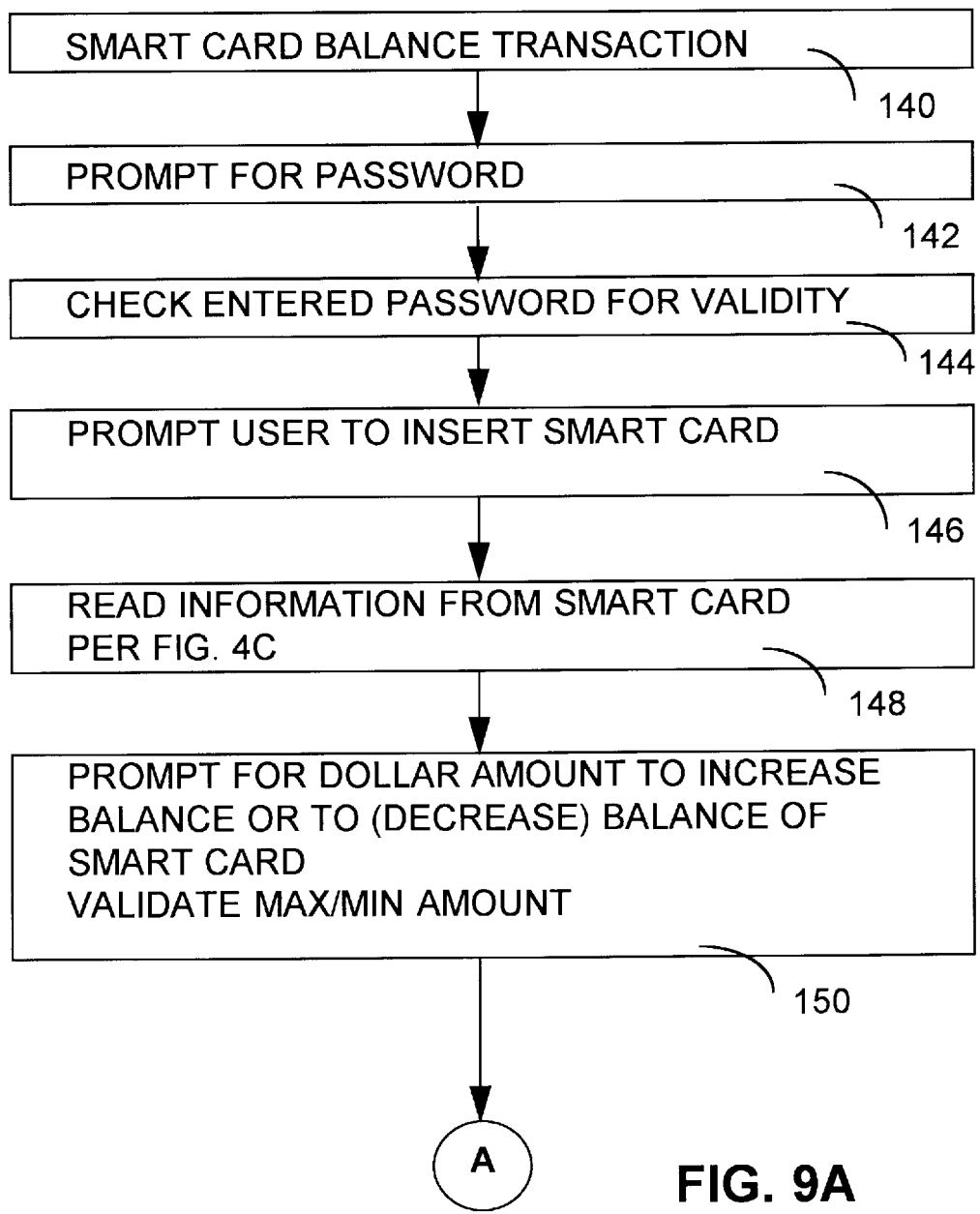
FIGS. 9A and 9B are flow diagrams of a method for smart card balance transactions using a secure keyboard in accordance with the present invention.
Figure 9B:
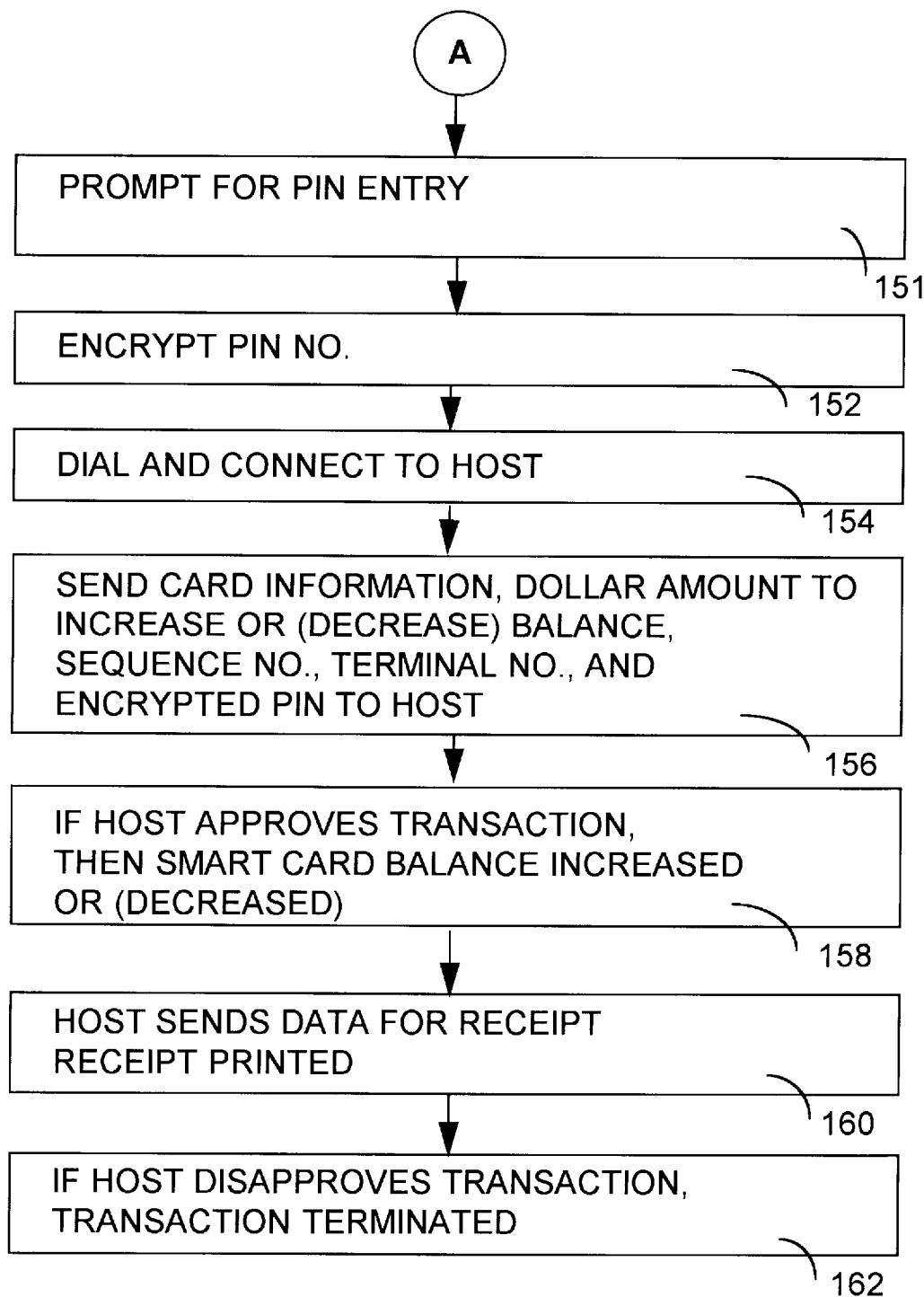

FIGS. 9A and 9B are flow diagrams of a method for smart card balance transactions using the secure keyboard 10. In step 140 a smart card balance transaction is selected. The user is then prompted via the monitor 16 in step 142 to enter a password with is checked in step 144 for validity. Then in the step 146 the user is prompted to insert the smart card into smart card interface 36. Then in step 148, the information as illustrated in FIG. 4C is read from the card. Then in step 150, the user is prompted via monitor 16 to enter a dollar amount for either increasing or decreasing the balance of the smart card. If the dollar amount on the smart card is increased then the account at the financial institution is debited. If the dollar amount on the smart card is decreased then the account at the financial institution is credited by the amount. Thus, a user via the secure keyboard can transfer money to and from the smart card. Also in step 150 the dollar amount that has been entered can be checked to determine whether the dollar amount is between certain maximum or minimum amounts that have been specified. In FIG. 9B, in step 151 the user is prompted to enter his or her personal identification number (PIN). Then in step 152 the PIN is encrypted by encrypter 40. The host is then dialed in step 154 using the host number read from host number register 42. Then in step 156, the card information, the dollar amount, the sequence number, the terminal number, and encrypted PIN are sent to the host. It is possible that some data items may not be sent and/or that additional data items may be sent. Also more of the data items can be encrypted by encrptor 40 before being sent. As discussed before, the sequence number is a number that increments each time a transaction is conducted in order to identify the transaction number on a receipt which can be printed later. The terminal number identify is another way to identify the source of the transaction to the host. In step 158 if the host approves the transaction then a smart card balance is increased or decreased. In step 160 the host sends data for a receipt and the receipt is printed using printer 14. Alternately, the receipt can be sent to a printer via printer port 33 on secure keyboard 10. In step 162, if the host disapproves the transaction, then the transaction is terminated.

FIG. 10 shows a receipt that is printed when the transaction in completed. As shown, the receipt includes the user name, the terminal number, the date, the amount credited or debited, the account number, the transaction type (smart card), the new balance for the smart card, a transaction reference number, and the sequence number. Note that the sequence number was originally sent from the secure keyboard to the host.

Figure 11:
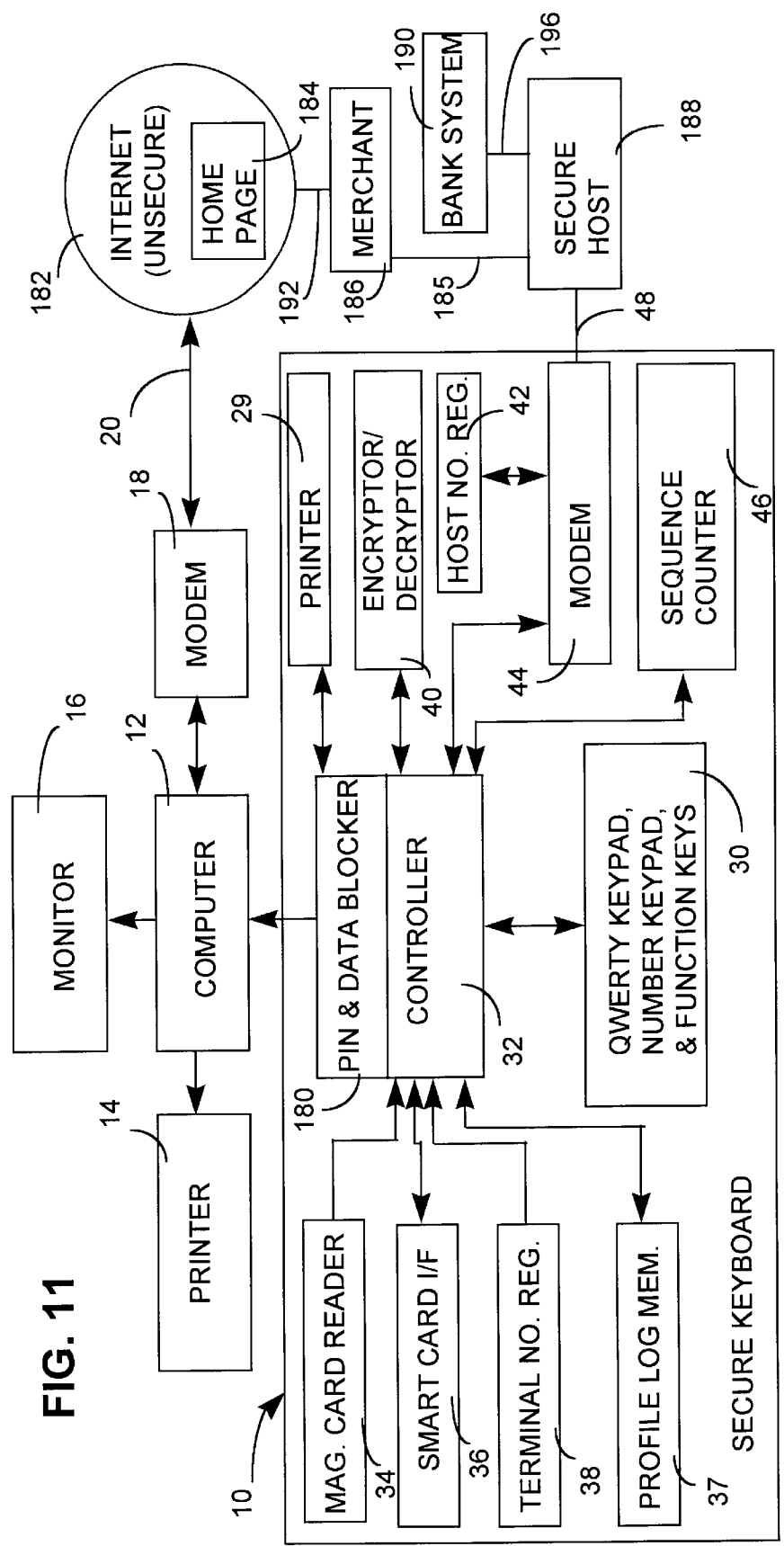
FIG. 11 is a schematic of a system including a computer, modem, secure keyboard, and secure host in accordance with the present invention.

FIG. 11 is a schematic of a system including a computer, modem, secure keyboard, and secure host in accordance with the present invention. In particular, FIG. 11 shows the coupling between computer 12, modem 18, and the Internet 182. FIG. 11 also shows the interface between secure keyboard 10, modem 44, and secure host 188. The Internet 182 contains home pages 184, which are created by merchants 186. The merchant 186 may be a merchant host or a payee host computer. The purpose of the secure host 188 is to prevent data that is sent from secure keyboard 10 via modem 44 to secure host 188 from being available or sent to the insecure Internet 182. The secure host 188 has an interface 196 to the banking system 190. The secure host also has an interface 185 to a merchant host 186. The secure host sends only data that is necessary to be sent via interfaces 185 and 186 and prevents sensitive information such as credit card information and personal identification number (PIN) data from being sent to the merchant 186. The secure host 188 does send the needed credit card/debit card/smart card information via interface 196 to the banking system 190 to request approval for financial transactions.

In summary, the system of FIG. 11 allows the user to browse the Internet via modem 18, find an item to buy or a bill to pay, retrieve that data from the Internet via modem 18, and then pay for the purchase or pay the bill using the secure keyboard 10 and communicating via modem 44 to secure host 188. This allows the sensitive data to remain out of the Internet entirely, while at the same time allowing the user to use the Internet for its strengths which are browsing for merchant data.

Figure 12:
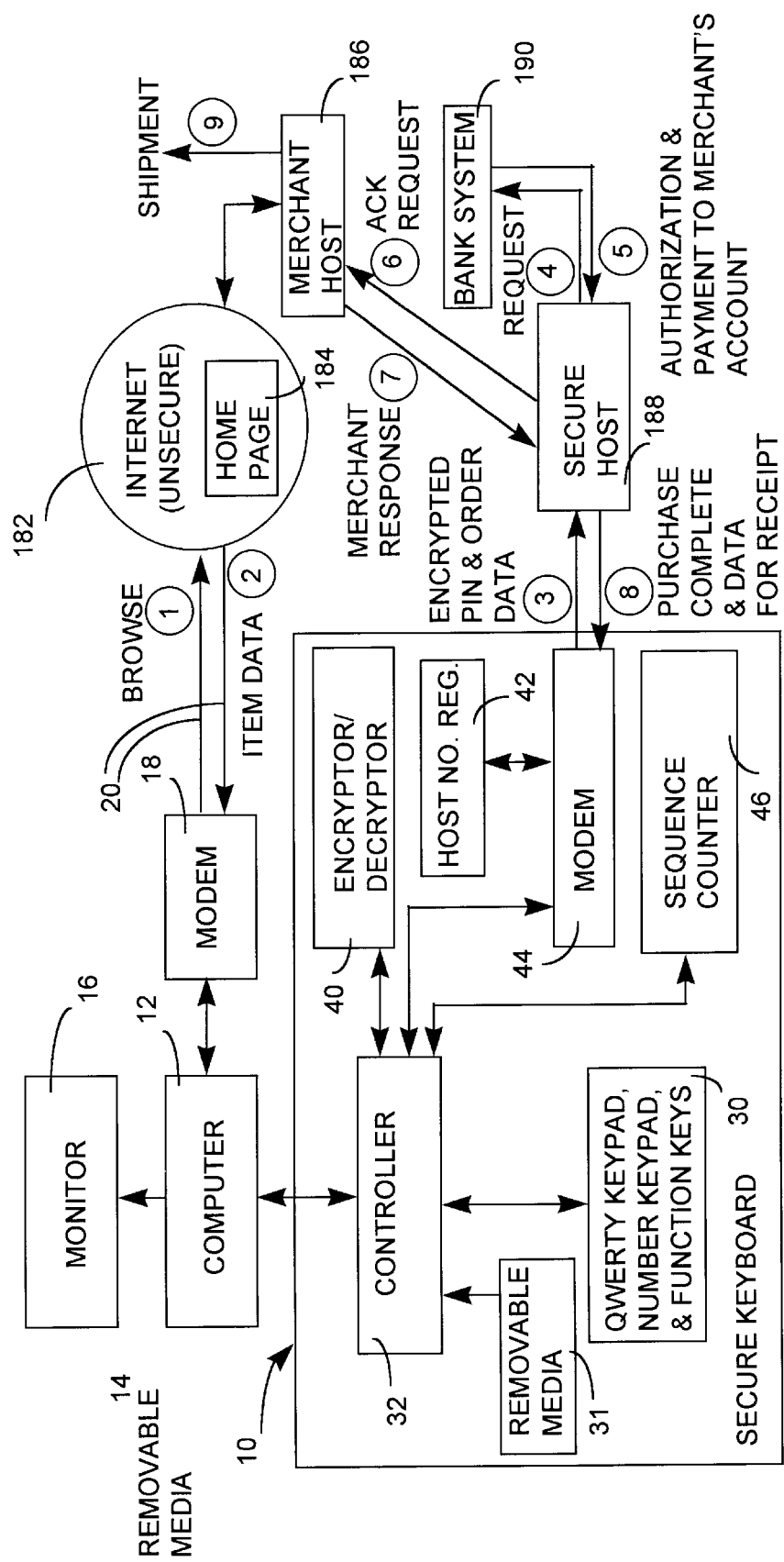
FIG. 12 is a schematic of the system of FIG. 11 illustrating the steps for a secure purchase transaction in accordance with the present invention.

FIG. 12 shows the sequence of a secure purchase transaction using the system of FIG. 11. First the user browses the Internet 182 via modem 18 which is connected to computer 12. This is indicated on FIG. 12 by the "1" in a circle. Next when the user finds something that he or she wishes to buy, the item data associated with the item is retrieved from the Internet and downloaded via modem 18 to computer 12. Next the user uses a credit card, a debit card or a smart card to make the purchase and enters the information from the card into the secure keyboard 10 via removable media interface 31. Removable media interface 31 is a reader which can read a credit card, a debit card and/or a smart card. After the removable media has been read, then the user enters his or her PIN. The PIN entry may not be required for a credit card transaction. The PIN is then encrypted and the credit card information can also be encrypted and then the PIN, the order data and the credit card, debit card or a smart card information are sent via modem 44 to secure host 188. Next the secure host sends the card information and the PIN to the banking system 190. The banking system checks to ensure that a proper credit card, debit card or smart card and PIN have been received and if the credit card/debit card/smart card and associated PIN is correct, then the banking system responds back to the secure host 188 with authorization to proceed with the transaction. Then the secure host notifies the merchant host 186 that there is purchase being made and the secure host can inform the merchant host what the item is and also identify the user that is buying the item. The merchant responds with an acknowledgment to the secure host and the secure host then can cause the banking system to make the payment to the merchant's account and then send data for the purchase transaction to modem 44. Then the secure keyboard can print a receipt on printer 29 shown in FIG. 11. Finally, the merchant host arranges shipment of the item to the user/consumer.

Since the payment to the merchant account is all done within the banking system from the user's banking account to the merchant's banking account, it is in general not necessary, especially in a debit transaction or a smart card transaction, to send any information about the debit card or the smart card to the merchant host. However, in a credit card transaction, the merchant may feel more secure in at least knowing the credit card number of the user for the transaction. So in the case of credit cards, the communication between the secure host and the merchant host may include the credit card number.

Figure 15:
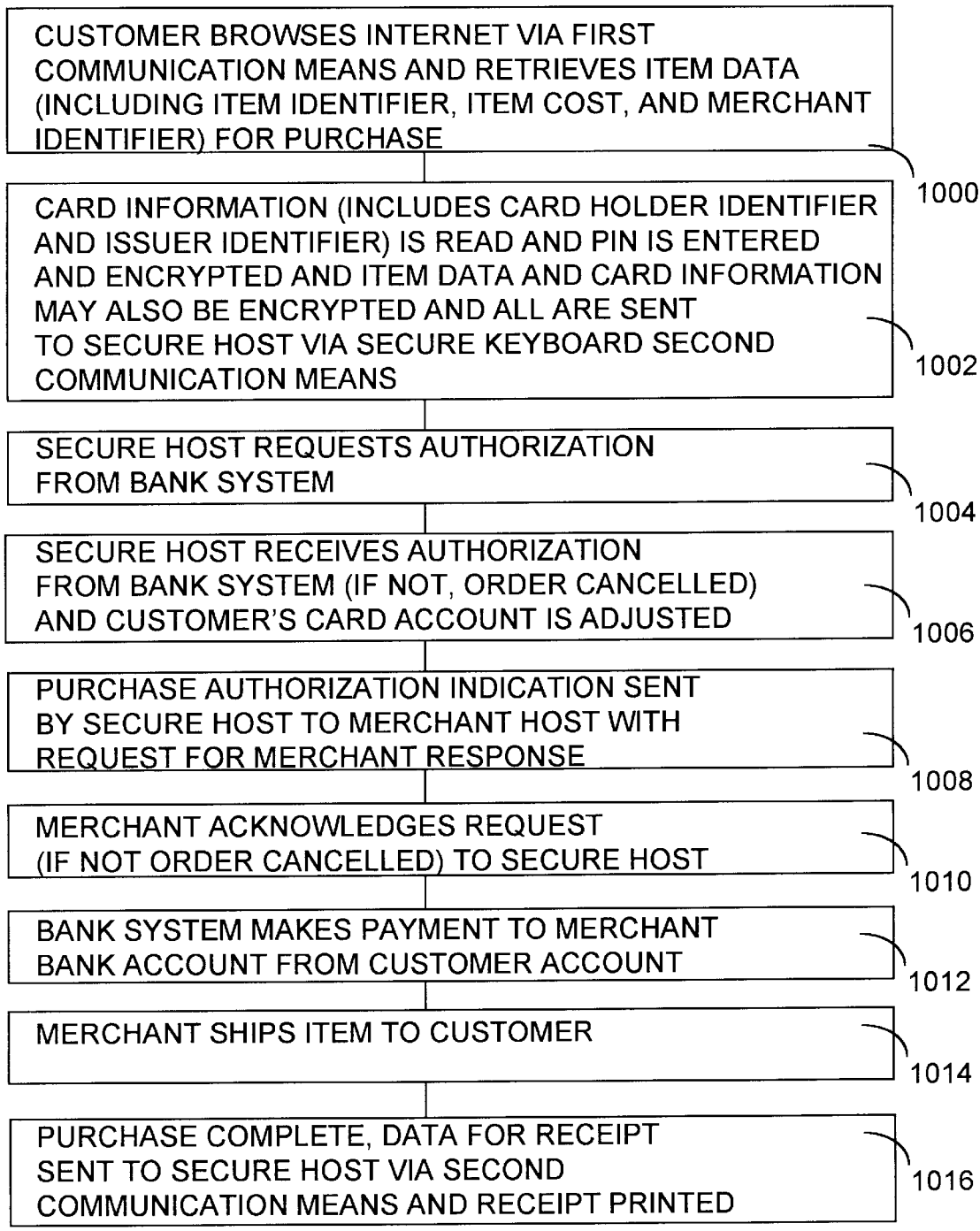
FIG. 15 is a flow diagram of a method for a secure purchase transaction using a secure keyboard in accordance with the present invention.

FIG. 15 is a flow diagram of a method for a secure purchase transaction using the secure keyboard. In step 1000 the customer browses the Internet via a first communication means, which is modem 18 in FIG. 11 and retrieves item data, which includes the item identifier, item cost, and merchant identifier for a purchase transaction. In step 1002 card information, which includes the card holder identifier and the issuer identifier, is read when the card holder inserts his or her card in the removable media interface 31. The user then enters a PIN which is encrypted and then the encrypted PIN, the item data, and the card information are all sent to secure host 188 via the secure keyboard second communication means, which in FIG. 11 corresponds to modem 44. Note that a PIN entry may not be required for a credit card transaction. Then in step 1004 the secure host requests authorization from the banking system. Then in step 1006 the secure host receives authorization from the banking system and, if not, the order is canceled. When the banking system gives authorization for the purchase, the customer's card account is adjusted. Then in step 1008, the purchase authorization is sent by the secure host to the merchant host with a request for the merchant response. This allows the merchant to know that the item has been ordered so that the merchant can make shipment and also so that the merchant can adjust his inventory and also be notified that he will be paid via the banking system for the transaction. Then in step 1010, the merchant acknowledges the request. If not, the order can be canceled. For instance, the merchant may not acknowledge the request if the item is not available. Then in step 1012 the banking system makes payment to the merchant bank account from the customer account. Then in step 1014 the merchant ships the item to the customer. Finally, in step 1016 the purchase is complete and data for the receipt is sent from the secure host to the secure keyboard via modem 44 and a receipt is printed on printer 29 or the receipt could be printed on printer 14 or another printer attached to printer port 33.

Figure 13:
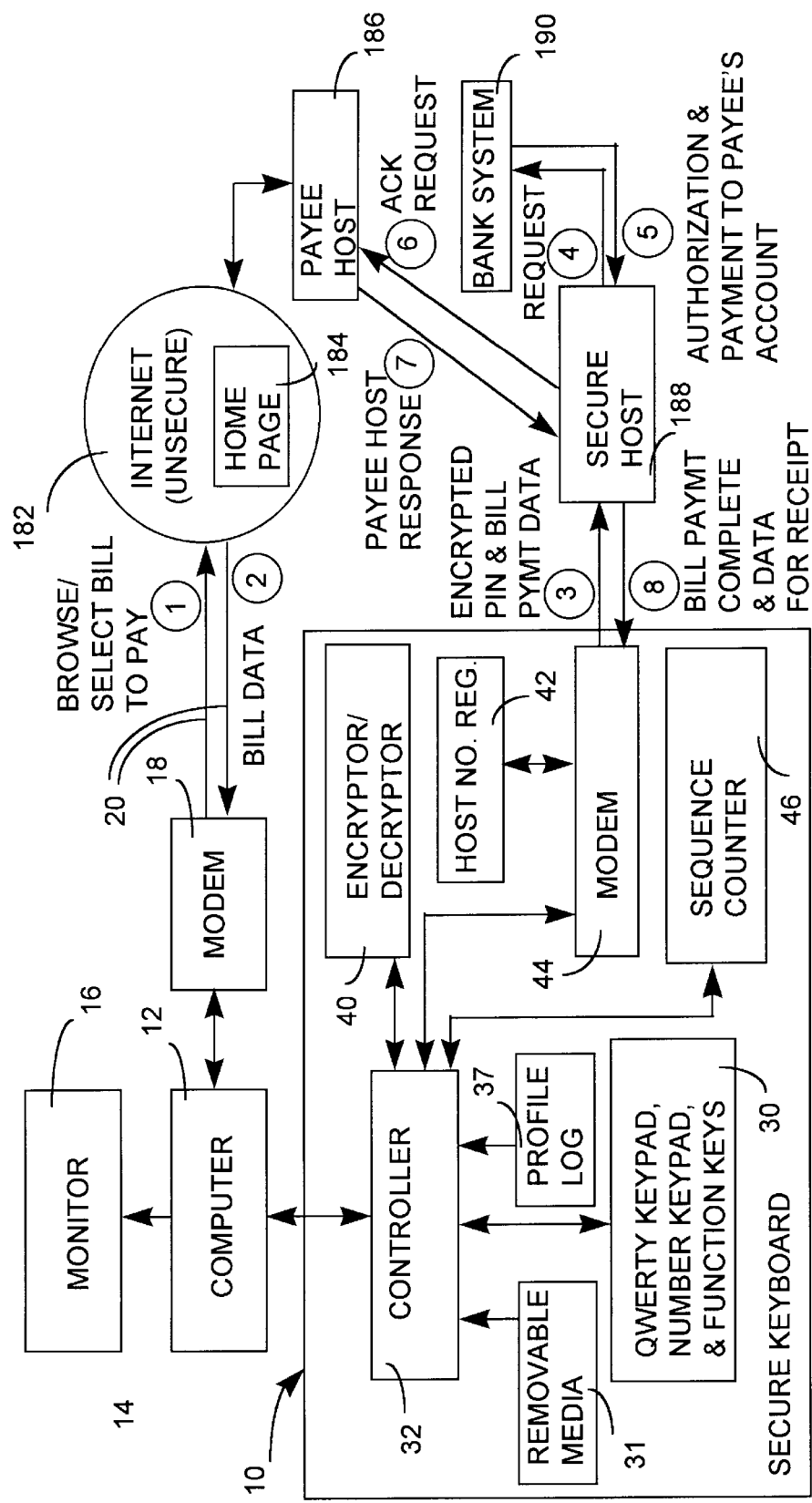
FIG. 13 is a schematic of the system of FIG. 11 illustrating the steps for a secure bill payment transaction in accordance with the present invention.

FIG. 13 illustrates the steps that are made to perform a secure bill payment transaction. First the user via modem 18 browses the Internet and selects a bill to pay. The selection of a bill to pay may be by going to a home page of a particular provider of a service such as a telephone company or it could be by going to a home page of a service which compiles bills from a number of companies and allows you to select which ones to pay that month. Once the user has selected a bill to pay, the bill data is returned to the user via modem 18. Next, the user scans the removable media information (i.e. credit card/debit card/smart card information) via removable media interface 31 and the user enters a PIN using QWERTY keypad 30. Note that for a credit card transaction the PIN may not be required. The PIN is encrypted using encrypter 40 and the encrypted PIN and the bill payment data is sent in step 3 to secure host 188. Then similar to the purchase transaction steps, the secure host requests authorization from the banking system 190 in step 4 and then in step 5 as is shown by the circled "5" on FIG. 13, the banking system if it authorized the payment notifies the secure host 188. Then the secure host notifies the payee of the payment and requests an acknowledgment from the payee. The notification to the payee is necessary so that the payee can adjust the bill data that is displayed in the Internet and also so that the payee will know that he or she is being paid. When the payee host responds in step 7, then the secure host sends bill payment data for printing a receipt back to the user via modem 44 in the secure keyboard 10.

Figure 16:
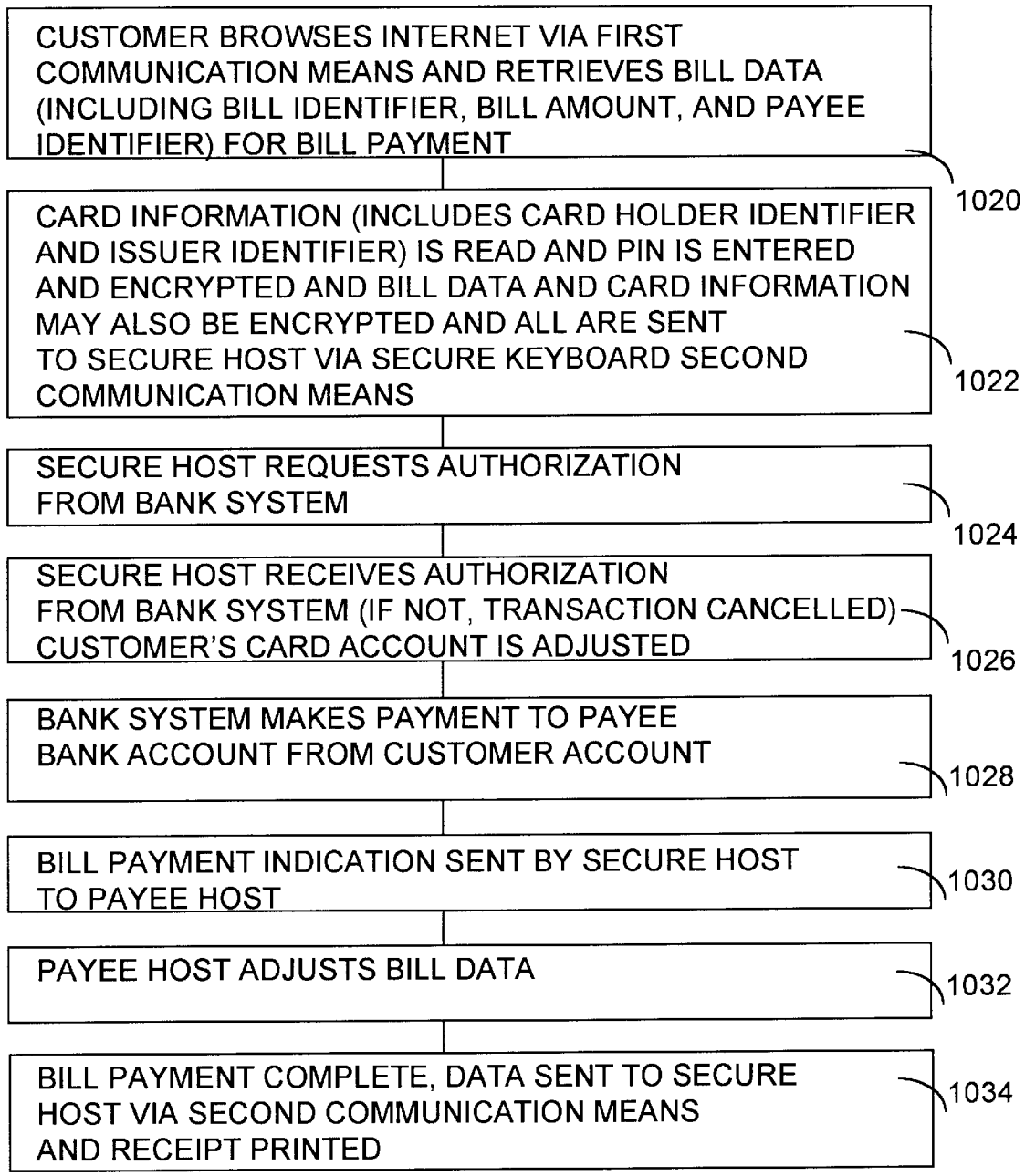
FIG. 16 is a flow diagram of a method for a secure bill payment transaction using a secure keyboard in accordance with the present invention.

FIG. 16 is a flow diagram of a method for a secure bill payment transaction using the secure keyboard. In step 1020 the customer browses the Internet via first communication means (e.g. modem 18) and retrieves the bill data for a bill to pay. The bill data includes a bill identifier, a bill amount and a payee identifier. In step 1022, card information is read using removable media interface 31 and a PIN is entered and encrypted. Note that for a credit card transaction the PIN may not be required. The bill data and card information may also be encrypted and then all are sent to secure host 188 via secure keyboard 44. Then the secure host requests authorization from the banking system in step 1024. If the secure host receives authorization from the banking system in step 1026, then the transaction is authorized, otherwise the transaction can be canceled. In step 1028, the bank system makes payment to the payee bank account from the customer account or charges the customer account credit card in the case of a credit card transaction. Then in step 1030, a bill payment indication is sent by the secure host to the payee host. Whether the bill payment indication includes a credit card number or not is determined according to the same considerations discussed above for a purchase transaction. In the case of a credit card the payee may need or want the credit card but in the case of a debit card or a smart card, the card information is not needed by the payee. In step 1032, the payee host adjusts the bill data which is displayed on the Internet to account for the payment of the bill and then in step 1034 the bill payment is complete and the data is sent to secure host via the second communication means (modem 44) so that a receipt can be printed.

Figure 14:
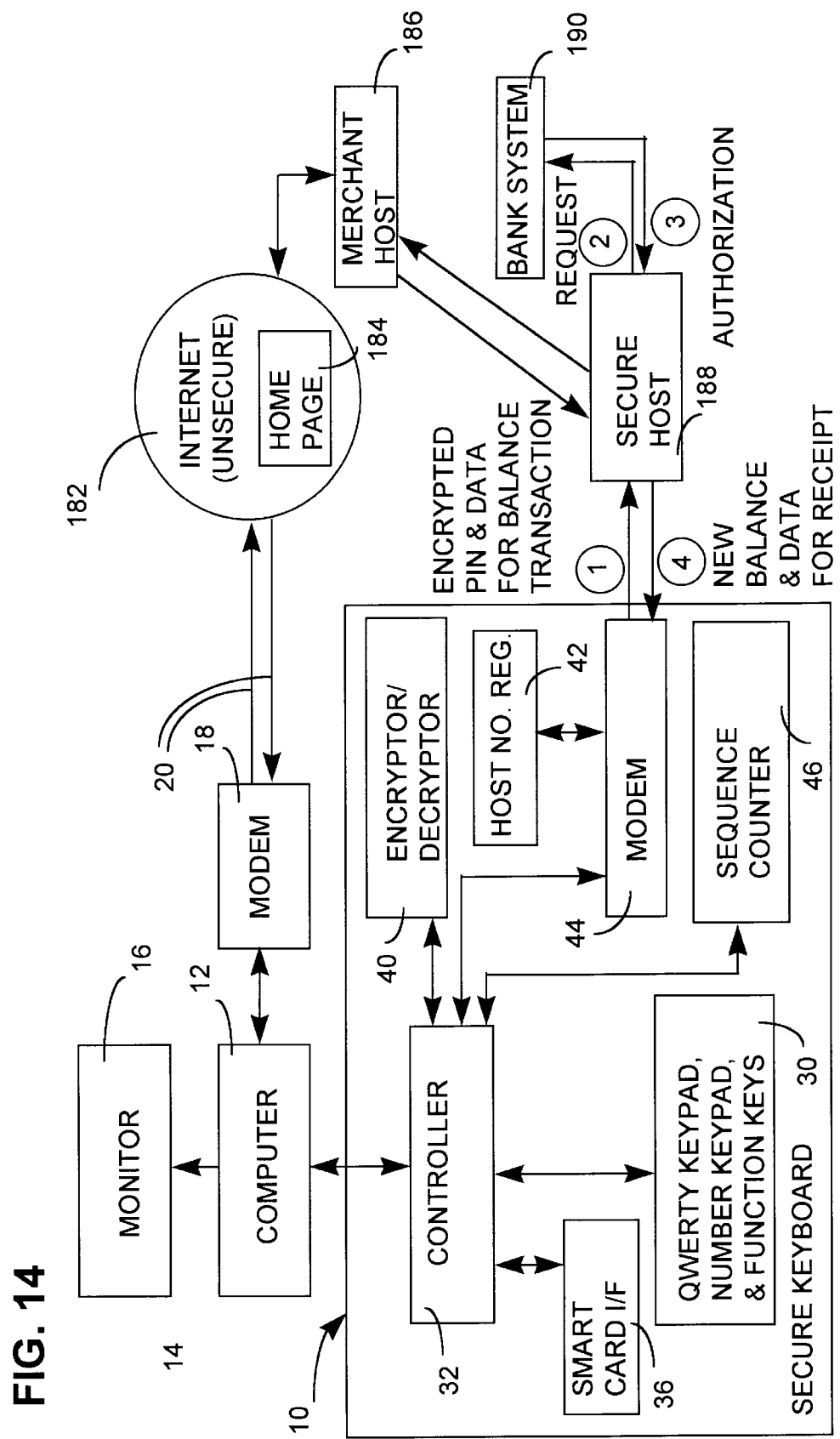
FIG. 14 is a schematic of the system of FIG. 11 illustrating the steps for a secure smart card balance transaction in accordance with the present invention.

FIG. 14 illustrates a smart card balance transaction which can be done in a secure fashion using the secure keyboard. In this case it is not necessary for the user to browse the Internet to find an item to buy or a bill to pay. Rather, the user wishes to increase or decrease the balance contained on the smart card. The first step is for the user to scan the smart card information using the removable media interface 31 or the smart card interface 36 which can be a component of the removable media interface 31. Then the user enters a PIN on the secure keyboard. The PIN is encrypted and the smart card information can also be encrypted and then sent to secure host 188. Then the secure host makes a request to the banking system to adjust the balance. The banking system inspects the account data and the PIN and if the transaction is authorized the bank system so notifies the secure host and then the secure host sends to the modem 44 in the secure keyboard 10, the data including the new balance and data for printing a receipt for the balance transaction. The new balance is written to the smart card via the removable media interface.

Figure 17:
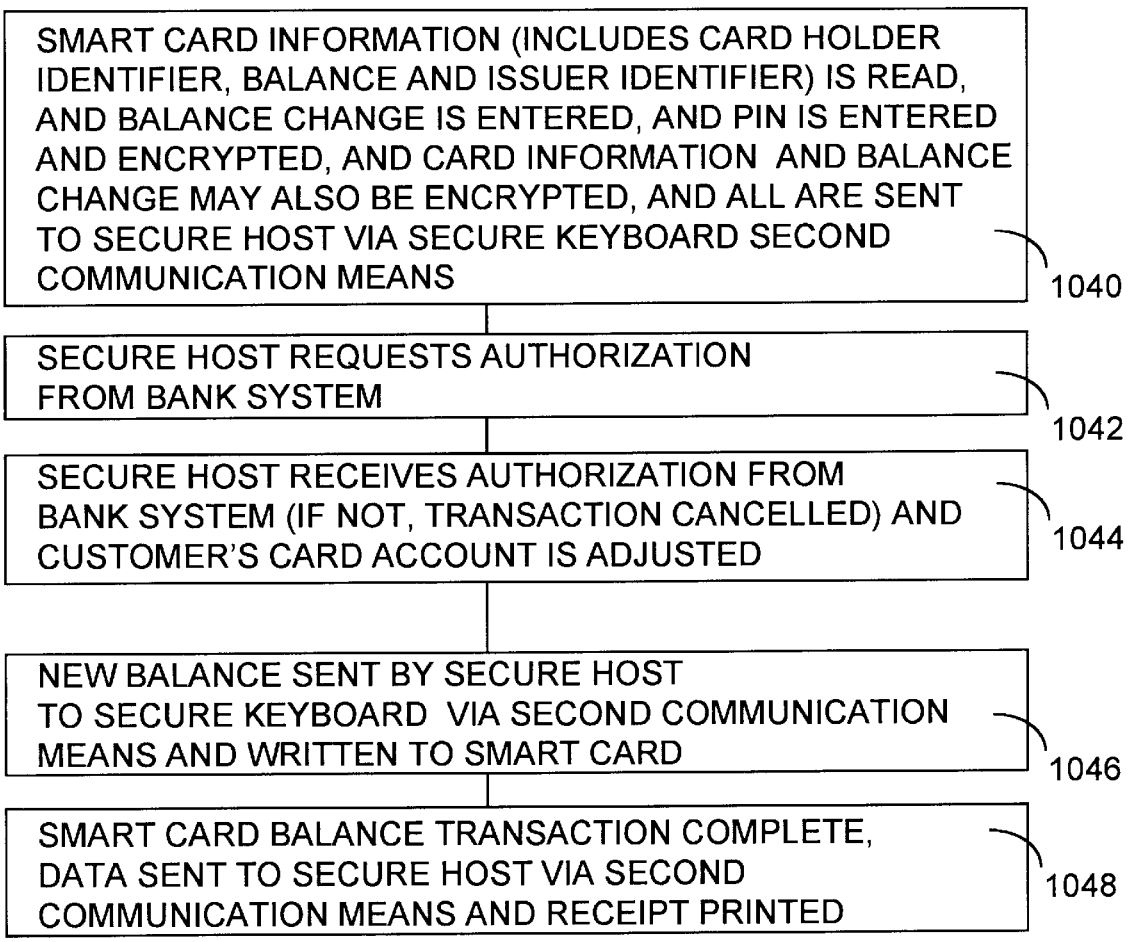
FIG. 17 is a flow diagram of a method for a secure smart card balance transaction using a secure keyboard in accordance with the present invention.

FIG. 17 illustrates the steps for the secure smart card balance transaction. In step 1040 smart card information which includes the card holder identifier balance and the issuer identifier is read. A desired balance change is entered by the user and a PIN is entered and encrypted. The card information and the balance change requested by the user may also be encrypted and then all are sent to secure host 188 via secure keyboard second communication means (modem 44). Then in step 1042, the secure host requests authorization from the banking system and then in step 1044 the secure host receives the authorization from the banking system and, if not, the transaction is canceled. If the transaction is authorized, then the customer's card account is adjusted. Then in step 1046 a new balance is sent by the secure host to the modem 44 and written to the smart card via smart card interface 36. Finally, in step 1048 the smart card balance transaction is complete and data is sent for the transaction from the secure host to the secure keyboard via modem 44 and a receipt is printed for the transactions using one of the printers discussed above.

Figure 18A:
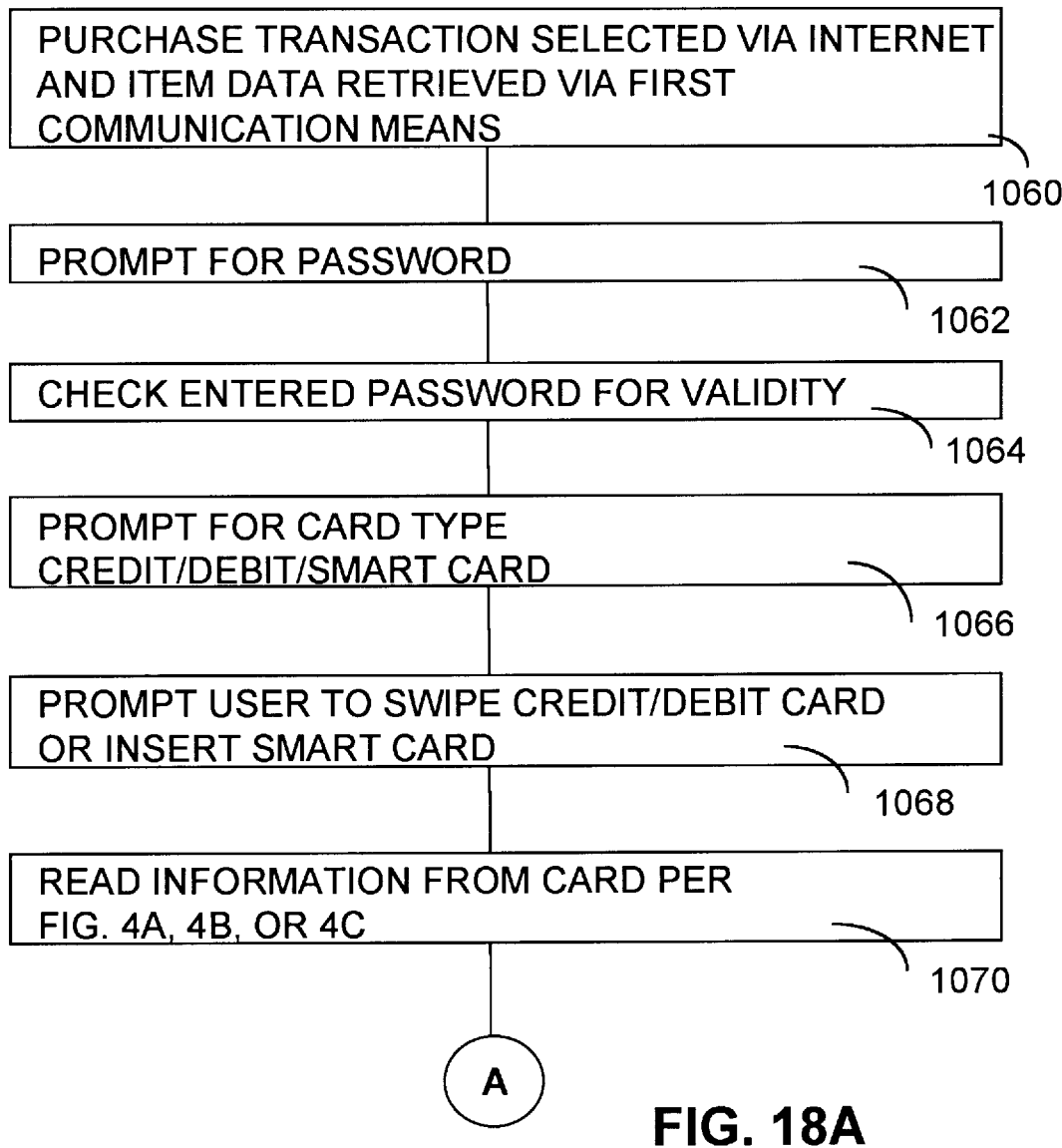
FIGS. 18A and 18B are flow diagrams of a method for a secure purchase transaction using a secure keyboard in accordance with the present invention.
Figure 18B:
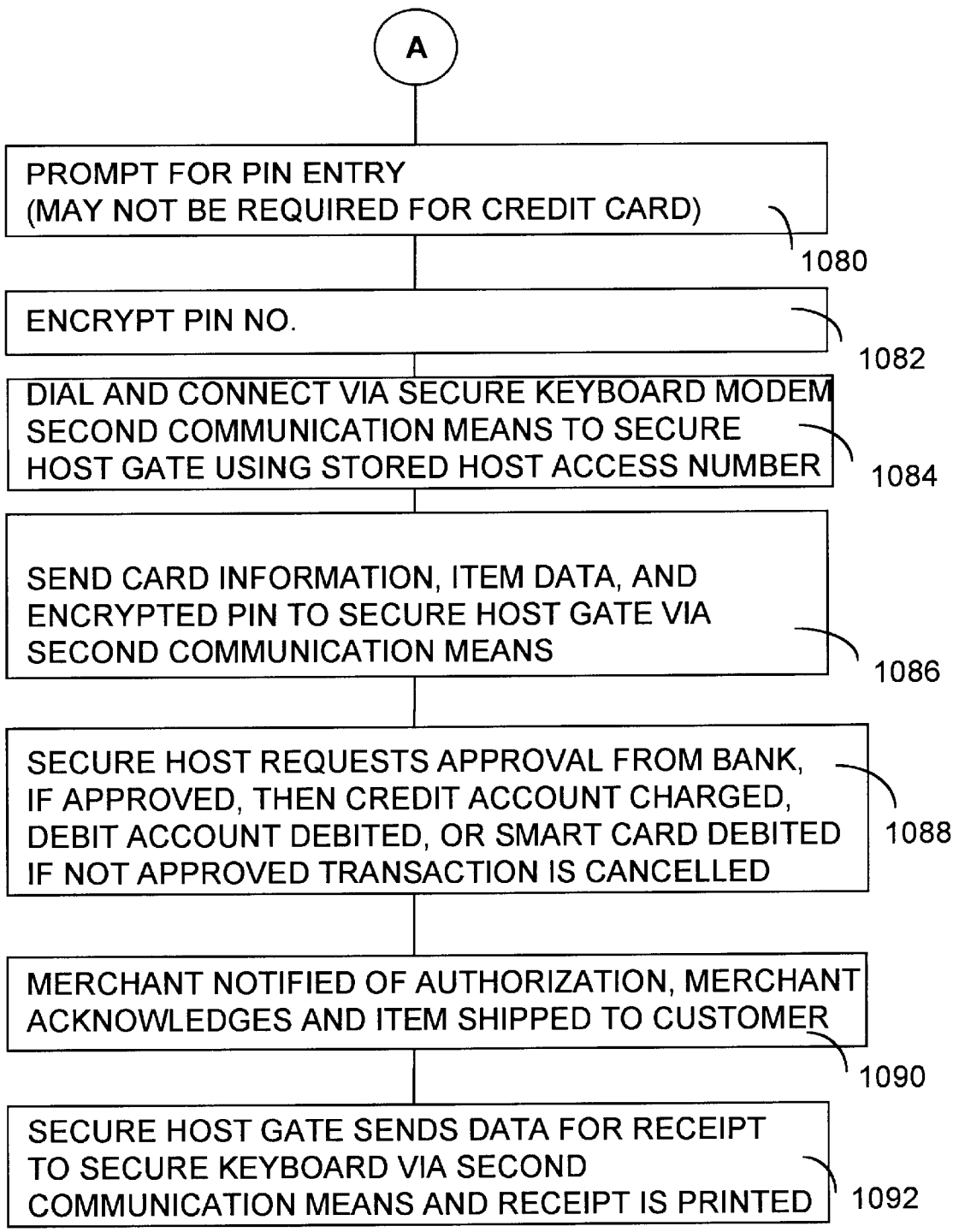

FIGS. 18A and 18B shows another more detailed method for a secure purchase transaction using the secure keyboard. The key difference between this method and the previous method is in the amount of detail that is included in FIGS. 18A and 18B. In step 1060, a purchase transaction is selected via the Internet and item data is retrieved via first communication means (modem 18). Then in step 1062, the user is prompted for a password. This step is optional but checking for a password for validity in 1064 can prevent other unauthorized users from using the secure keyboard for these kind of transactions. Then in step 1066, the user is prompted for the card type, whether it is a credit, debit or smart card transaction. Step 1066 is optional, because the removable media interface can sense the type of card it is reading. In step 1068 the user swipes or inserts or in some way interfaces the credit/debit/smart card to the removable media interface 31. Then in step 1070 the information is read from the card. Then in step 1080 the user is prompted for a PIN entry, which may not be required for a credit card, and then in step 1082 the PIN is encrypted. Then in step 1084 the secure keyboard modem dials and connects to the secure host using the host access number stored in host number register 42. Then the card information, the item data and the encrypted PIN are sent to the secure host via modem 44. Then in step 1088 the secure host requests approval from the bank for the transaction. If the approval is granted, then the credit account is charged, or the debit account is debited or the smart card is debited by reducing the balance on the smart card. If the bank does not approve the transaction, then the transaction is canceled. Then in step 1090 the purchaser is notified of the authorization and the merchant acknowledges the authorization and ships the item to the customer. Finally, in step 1092, the secure host sends data for a receipt to the secure keyboard via modem 44 and a receipt is printed.

Figure 19A:
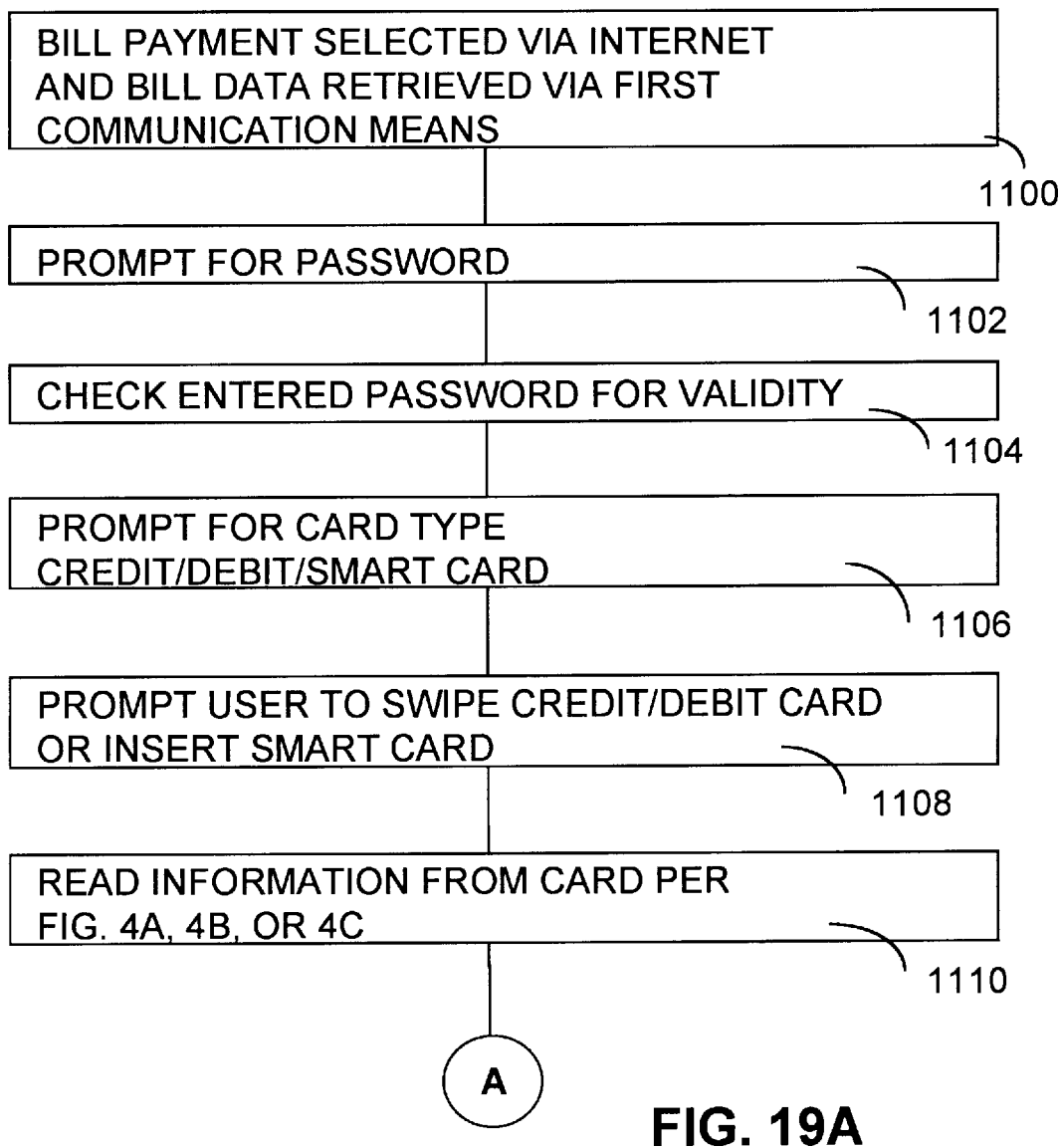
FIGS. 19A and 19B are flow diagrams of a method for a secure bill payment transaction using a secure keyboard in accordance with the present invention.
Figure 19B:
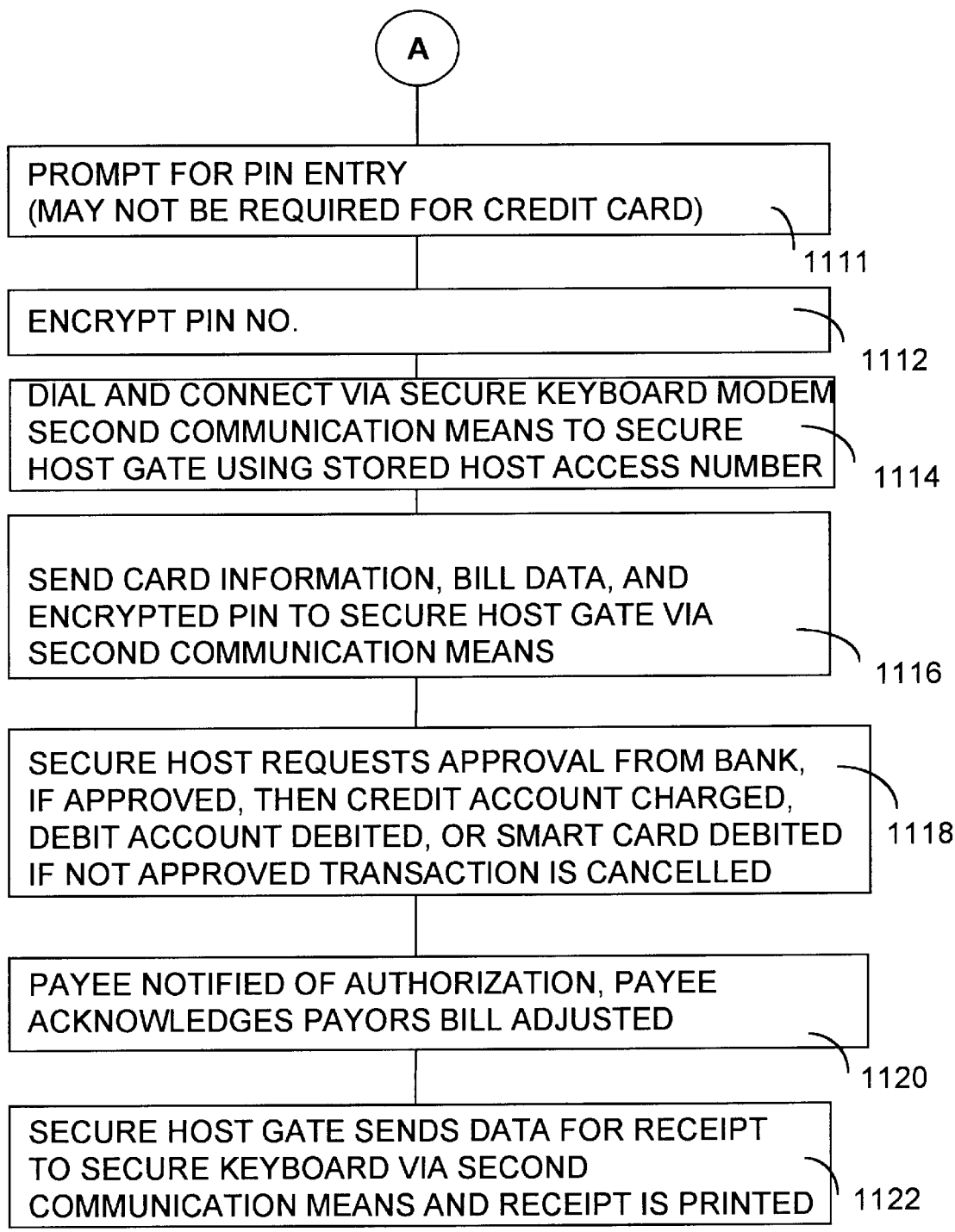

FIGS. 19A and 19B show a detailed method for a secure bill payment transaction. In step 1100 a bill payment transaction is selected and a particular bill is selected via the Internet for payment. Then the bill data is retrieved via modem 18. Then in step 1102 the user is prompted for a password and the entered password is checked for validity in step 1104. Then in step 1106, the user is prompted for a card type, whether it be credit, debit or smart card. As discussed above this step is optional. Then in step 1108 the user is prompted to enter the credit/debit/smart card information by swiping or inserting the cards. Then in step 1110, the information is read from the card according to the type of information shown in FIGS. 4A, 4B, or 4C, respectively for credit, debit, or smart cards. Then in step 1111 the user is prompted for entering a PIN, which may not be required for a credit card. Then in step 1112, the PIN is encrypted and then in step 1114 the secure host is dialed by using the host access number stored in host register 42 and the secure keyboard modem 44 is connected to the secure host 188. Then in step 1116 the card information, the bill data and the encrypted PIN are sent to the secured host via the modem 44 in the secure keyboard 10. Then in step 1118, the secure host requests approval from the banking system and if it is approved then the credit card account is charged, or the debit account is debited or the smart card is debited by reducing the balance of the smart card. If not approved, the transaction is canceled. In step 1120, the payee is notified of the authorization and the payee acknowledges the payment and the payer's bill is adjusted. Then in step 1122, the secure host sends data for printing a receipt to the secure keyboard via modem 44 and a receipt is printed.

Figure 20A:
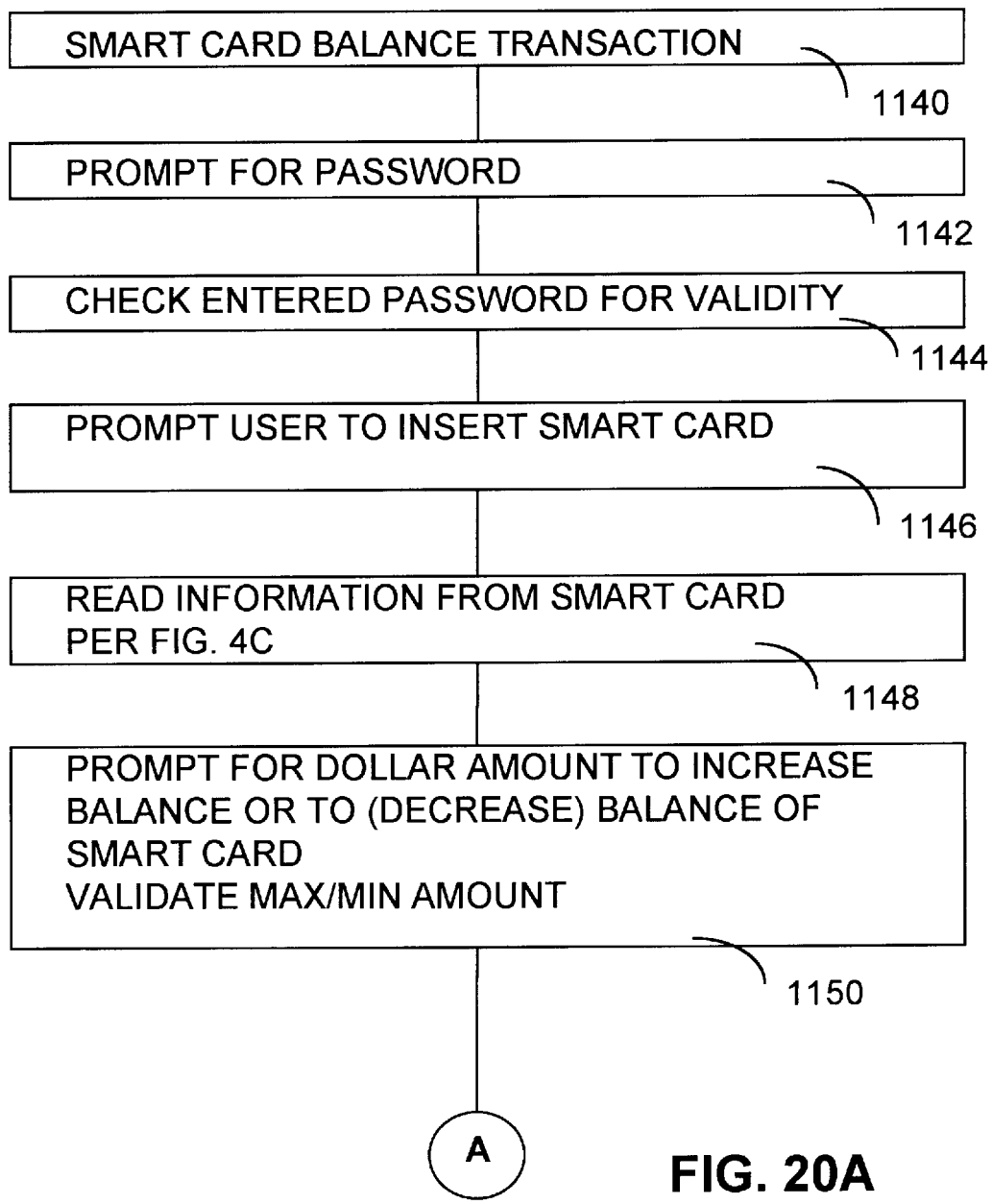
FIGS. 20A and 20B are flow diagrams of a method for a secure smart card balance transaction using a secure keyboard in accordance with the present invention.
Figure 20B:
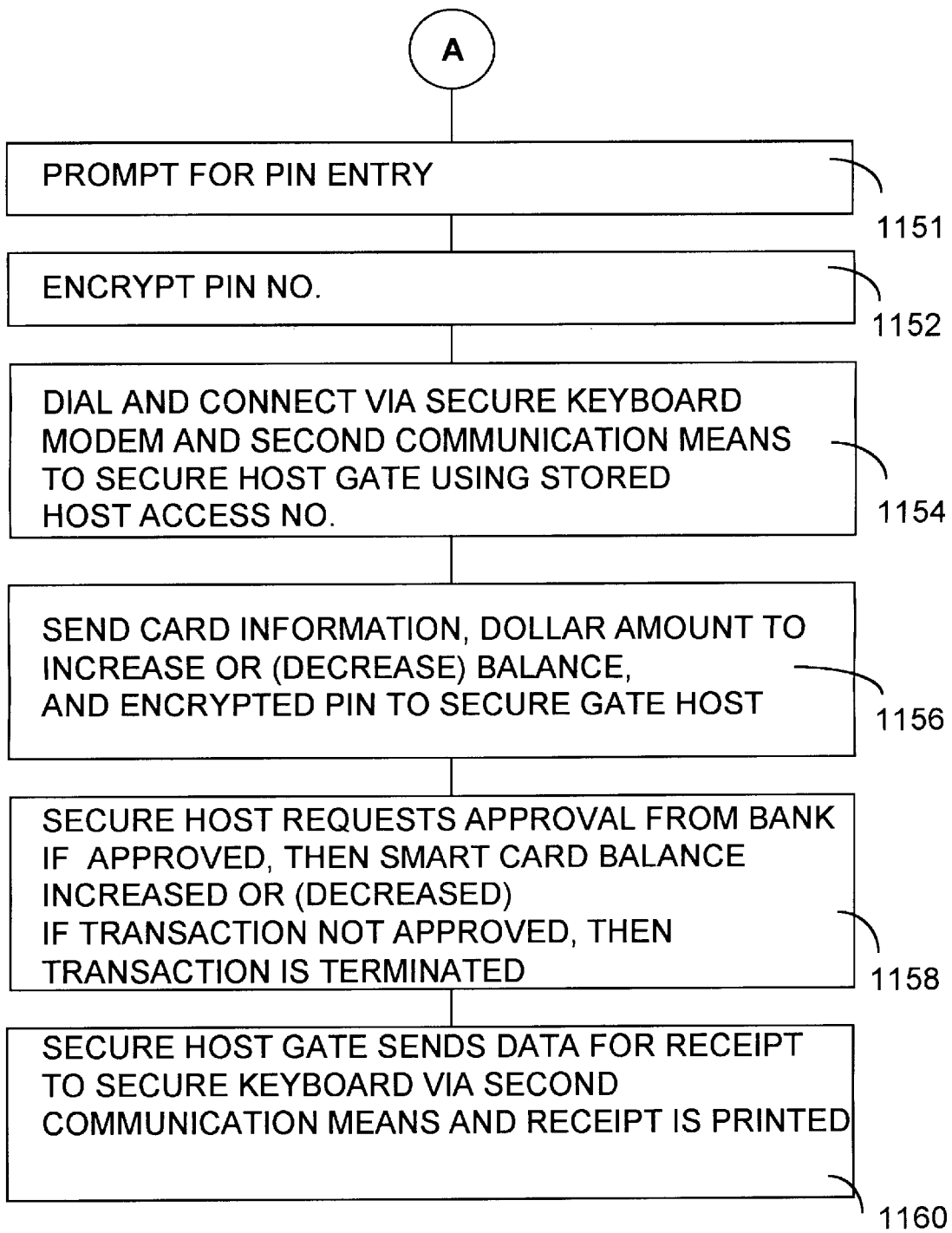

FIGS. 20A and 20B illustrate a detailed smart card balance transaction. In step 1142, the user is prompted for a password, which is checked for validity in step 1144. The password is used to prevent an unauthorized user from using the secure keyboard for a smart card transaction. Then in step 1146, the user is prompted to insert the smart card into the smart card reader 36 included in the removable media interface 31. Then in step 1148 the information is read from the smart card. In step 1150, the user is prompted for the dollar amount to increase the balance or to decrease the balance of the smart card. The amount entered is validated against a pre-known maximum or minimum threshold amount. If the dollar amount is above or below the maximum thresholds, then the transaction is canceled, otherwise the transaction is allowed to proceed. Then in step 1151 the user is prompted for entering a PIN and in step 1152, the PIN is encrypted. Then in step 1154, the secure keyboard modem dials and connects to the secure host 188 using the stored access number which is stored in host register 42. Then in step 1156 the card information, the dollar amount to increase or decrease the balance, and the encrypted PIN are sent to the secured host. It is possible to also encrypt the card information and the dollar amount before these are sent to the secure host. In step 1158, the secure host requests approval from the bank and if approved then the smart card balance is increased or decreased by sending the proper information via modem 44 to the smart card interface 36 and writing the new balance onto the smart card. If the transaction is not approved by the bank then the transaction is terminated. Finally, in step 1160 the secure host sends data for a receipt for the smart card transaction to the secure keyboard via modem 44 and a receipt is printed.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method for transacting a secure purchase via an internet using a system including a computer, a first means for communicating coupled to the computer and coupled to the internet, and a secure keyboard, the secure keyboard comprising a controller, an interface between the controller and the computer, means for reading information from a removable media, an alphanumeric keypad, means for encrypting, and a second means for communicating coupled to a secure host, the method comprising the steps of:

browsing the internet via the first means for communicating;

retrieving item data for a purchase from the internet via the first means for communicating, the item data including an item identifier, an item cost and a merchant identifier;

accessing information from removable media using the means for reading information from the removable media, the information including a user identifier and an issuer identifier;

entering a personal identifier number (PIN) on the alphanumeric keypad;

encrypting the PIN using the means for encrypting;

sending to the secure host via the second means for communicating, the information, the item data, and the encrypted PIN;

the secure host blocking the information and the PIN from the internet;

the secure host requesting authorization from a bank system for making the purchase using the information and PIN;

proceeding with the purchase if the secure host receives from the bank system a bank authorization for the purchase, otherwise canceling the purchase;

the secure host sending purchase transaction data to the secure keyboard via the second means of communicating; and the secure keyboard printing a purchase transaction receipt.

2. The method of claim 1 further comprising the steps of:

the secure host sending an indication of the bank authorization to a merchant host and requesting a response;

proceeding with the purchase if the merchant host responds with an acknowledgement, otherwise canceling the transaction;

the bank system making payment to a merchant account; and the merchant delivering the item to the customer.

3. The method of claim 1 wherein the means for reading information from a removable media step comprises means for writing information to the removable media, and wherein:

the step of accessing information from removable media comprises the step of:
reading a balance from the removable media; and
the step of sending to the secure host via the second means for communicating, the information, the item data, and the encrypted PIN comprises the step of:
sending the balance to the secure host.

4. The method of claim 3 wherein the step of the secure host sending purchase transaction data to the secure keyboard via the second means for communicating comprises the step of sending a new balance with the purchase transaction data and the method further comprises the step of writing the new balance to the removable media.

5. The method of claim 1 wherein the alphanumeric keypad comprises a QWERTY keypad.

6. The method of claim 1 wherein the step of the secure host sending purchase transaction data to the secure keyboard via the second means for communicating comprises the step of:

encrypting the purchase transaction data before sending the purchase transaction data; and the method comprises the step of decrypting the purchase transaction data.

7. The method of claim 1 further comprising the step of:

connecting to the secure host via the second means for communicating using a stored host access number.

8. A method for transacting a secure bill payment via an internet using a system including a computer, a first means for communicating coupled to the computer and coupled to the internet, and a secure keyboard, the secure keyboard comprising a controller, an interface between the controller and the computer, means for reading information from a removable media, an alphanumeric keypad, means for encrypting, and a second means for communicating coupled to a secure host, the method comprising the steps of:

browsing the internet via the first means for communicating;

retrieving bill data for a bill payment from the internet via the first means for communicating, the bill data including a bill identifier, a bill amount, and a payee identifier;

accessing information from removable media using the means for reading information from the removable media, the information including a user identifier and an issuer identifier;

entering a personal identifier number (PIN) on the alphanumeric keypad;

encrypting the PIN using the means for encrypting;

sending to the secure host via the second means for communicating, the information, the bill data, and the encrypted PIN;

the secure host blocking the information and the PIN from the internet;

the secure host requesting authorization from a bank system for making the bill payment using the information and PIN;

proceeding with the bill payment if the secure host receives from the bank system a bank authorization for the bill payment, otherwise canceling the bill payment;

the secure host sending bill payment transaction data to the secure keyboard via the second means of communicating, the bill payment transaction data including the amount paid and the payee identifier; and the secure keyboard printing a bill payment receipt.

9. The method of claim 8 further comprising the steps of:

the bank system making payment to a payee account;

the secure host sending an indication of the payment to a payee host; and the payee host adjusting the bill data.

10. The method of claim 8 wherein the means for reading information from a removable media step comprises means for writing information to the removable media, and wherein:

the step of accessing information from removable media comprises the step of:
reading a balance from the removable media; and
the step of sending to the secure host via the second means for communicating, the information, the bill data, and the encrypted PIN comprises the step of:
sending the balance to the secure host.

11. The method of claim 10 wherein the step of the secure host sending bill payment transaction data to the secure keyboard via the second means for communicating comprises the step of sending a new balance with the bill payment transaction data and the method further comprises the step of writing the new balance to the removable media.

12. The method of claim 8 wherein the alphanumeric keypad comprises a QWERTY keypad.

13. The method of claim 8 wherein the step of the secure host sending bill payment transaction data to the secure keyboard via the second means for communicating comprises the step of:

encrypting the bill payment transaction data before sending the bill payment transaction data; and the method comprises the step of decrypting the bill payment transaction data.

14. The method of claim 8 further comprising the step of:

connecting to the secure host via the second means for communicating using a stored host access number.

15. A system for secure electronic financial transactions using an internet, the system comprising:

a computer;

a first means for communicating coupled to the computer and coupled to the internet for retrieving first data from the internet;

a secure keyboard comprising:
a controller having an interface to the computer;
means coupled to the controller for reading information from a removable media, the information including a user identifier and an issuer identifier;
an alphanumeric keypad coupled to the controller for entering a personal identification number (PIN);
means for encrypting coupled to the controller; and
second means for communicating the information, the first data, and the encrypted PIN to a secure host, the second means for communicating coupled to the controller and the secure host;

wherein the secure host comprises means for blocking the information and the PIN from the internet.

16. The system of claim 15 wherein the means coupled to the controller for reading information from a removable media comprises means coupled to the controller for writing information to the removable media, the information including a balance.

17. The keyboard of claim 15 wherein the first data comprises an item identifier, an item cost, and a merchant identifier for transacting a purchase.

18. The keyboard of claim 15 wherein the first data comprises a bill identifier, a bill amount, and a payee identifier for transacting a bill payment.

19. The system of claim 15 wherein:

the second means for communicating comprises means for receiving transaction data from the secure host; and the secure keyboard further comprises a printer.

20. The system of claim 19 wherein the alphanumeric keypad comprises a QWERTY keypad.

21. A secure keyboard for secure electronic financial transactions, the secure keyboard comprising:

a case;

a controller integral to the case and having an interface to a computer;

means integral to the case and coupled to the controller for reading information from a removable media;

a QWERTY alphanumeric keypad integral to the case and coupled to the controller for entering a PIN;

means for encrypting the PIN integral to the case and coupled to the controller; and means for communicating the information and the encrypted PIN to a secure host, the means for communicating integral to the case and coupled to the controller and the secure host.

* * * * *